US006660828B2

(12) United States Patent
Thomas et al.

(10) Patent No.: US 6,660,828 B2
(45) Date of Patent: Dec. 9, 2003

(54) FLUORINATED SHORT CARBON ATOM SIDE CHAIN AND POLAR GROUP CONTAINING POLYMER, AND FLOW, OR LEVELING, OR WETTING AGENTS THEREOF

(75) Inventors: Richard R. Thomas, Stow, OH (US); Robert E. Medsker, Hartville, OH (US); Charles M. Kausch, Copley, OH (US); Daniel D. Woodland, Monroe Falls, OH (US); Gary L. Jialanella, Stow, OH (US); Raymond J. Weinert, Macedonia, OH (US); Jane E. Leising, Medina, OH (US); James E. Robbins, Twinsburg, OH (US); Brian T. Cartwright, Rock Hill, SC (US)

(73) Assignee: Omnova Solutions Inc., Fairlawn, OH (US)

(*) Notice: Subject to any disclaimer, the term of this patent is extended or adjusted under 35 U.S.C. 154(b) by 0 days.

(21) Appl. No.: 09/855,053

(22) Filed: May 14, 2001

(65) Prior Publication Data

US 2003/0092862 A1 May 15, 2003

(51) Int. Cl.⁷ .............................................. C08G 65/22
(52) U.S. Cl. .................... 528/402; 528/299; 106/3; 106/10; 525/437; 525/438; 525/934
(58) Field of Search ................................ 528/402, 299; 525/437, 438, 934; 106/10, 3

(56) References Cited

U.S. PATENT DOCUMENTS

| | | |
|---|---|---|
| 2,995,571 A | 8/1961 | Harris Jr. |
| 3,096,344 A | 7/1963 | Case |
| 3,100,722 A | 8/1963 | Hermann et al. |
| 3,164,610 A | 1/1965 | Davis |
| 3,210,298 A | 10/1965 | Weissermel et al. |
| 3,457,193 A | 7/1969 | Tinsley et al. |
| 3,576,802 A | 4/1971 | Luders et al. |
| 3,609,156 A | 9/1971 | Munakata et al. |
| 3,681,413 A | 8/1972 | Sweeney et al. |
| 3,779,942 A | 12/1973 | Bolles |
| 3,787,294 A | 1/1974 | Kurosaki et al. |
| 3,834,823 A | 9/1974 | Seregely et al. |
| 3,859,253 A | 1/1975 | Bourat et al. |
| 3,922,457 A | 11/1975 | Barnwell et al. |
| 3,949,132 A | 4/1976 | Seregely et al. |
| 4,035,149 A | 7/1977 | Scott et al. |
| 4,051,195 A | 9/1977 | McWhorter |
| 4,059,451 A | 11/1977 | Oita et al. |
| 4,079,084 A * | 3/1978 | Houghton .............. 260/615 BF |
| 4,098,654 A | 7/1978 | Helle et al. |
| 4,107,055 A | 8/1978 | Sukornick et al. |
| 4,118,541 A | 10/1978 | Power et al. |
| 4,222,828 A | 9/1980 | Zuurdeeg |
| 4,278,773 A | 7/1981 | Kleber et al. |
| 4,302,374 A | 11/1981 | Helle et al. |
| 4,388,396 A | 6/1983 | Nishibayashi et al. |
| 4,521,571 A | 6/1985 | Ishido et al. |
| 4,574,139 A | 3/1986 | Sato et al. |
| 4,579,765 A | 4/1986 | Schachtner |
| 4,603,074 A | 7/1986 | Pate et al. |
| 4,686,275 A | 8/1987 | Bryant et al. |
| 4,709,060 A | 11/1987 | Ohsaka et al. |
| 4,746,576 A | 5/1988 | Ozu et al. |
| 4,765,975 A | 8/1988 | Iovanni et al. |
| 4,857,396 A | 8/1989 | Otonari et al. |
| 4,898,849 A | 2/1990 | Kang |
| 4,898,981 A | 2/1990 | Falk et al. |
| 4,946,992 A | 8/1990 | Falk et al. |
| 4,988,123 A | 1/1991 | Lin et al. |
| 5,043,221 A | 8/1991 | Koleske |
| 5,045,624 A * | 9/1991 | Falk et al. .................... 528/70 |
| 5,068,397 A | 11/1991 | Falk et al. |
| 5,097,048 A | 3/1992 | Falk et al. |
| 5,149,564 A | 9/1992 | Kato et al. |
| 5,162,384 A | 11/1992 | Owens et al. |
| 5,166,230 A | 11/1992 | Stecker |
| 5,166,288 A | 11/1992 | Kanai et al. |
| 5,189,135 A | 2/1993 | Cozzi et al. |
| 5,206,066 A | 4/1993 | Horacek |
| 5,214,121 A | 5/1993 | Mosch et al. |
| 5,218,031 A | 6/1993 | Nayder et al. |
| 5,230,954 A | 7/1993 | Sakamoto et al. |
| 5,259,848 A | 11/1993 | Terry et al. |
| 5,300,394 A | 4/1994 | Miller et al. |
| 5,302,462 A | 4/1994 | Shah et al. |
| 5,324,764 A | 6/1994 | Fujita et al. |

(List continued on next page.)

FOREIGN PATENT DOCUMENTS

| | | |
|---|---|---|
| EP | 348 350 | 12/1989 |
| WO | WO 96/18699 | 6/1996 |
| WO | WO 96/23828 | 8/1996 |
| WO | W) 99/26992 | 6/1999 |
| WO | WO 99/45079 | 9/1999 |
| WO | WO 00/46270 | 8/2000 |

OTHER PUBLICATIONS

U.S. patent application Ser. No. 60/144,375, Jul. 16, 1999.
CA entries and Derwent patent family printouts on JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nernes from Barry Bastion, Product Manager, GenCorp.
Abstracts of JP 03275859; JP 04363370; JP 07004064; JP 07039812; JP 08283654; JP 6216941; and JP 63248827.

*Primary Examiner*—Margaret G. Moore
(74) *Attorney, Agent, or Firm*—Daniel J. Hudak; David G. Burleson

(57) ABSTRACT

The polymer of the present invention is derived from cyclic ether monomers, dioxane, dioxalane or trioxane and contains both pendant $R_f$ fluoro groups as well as polar groups. These polymers have good wetting, or flow, or leveling properties. They can be reacted with other monomers, such as in the preparation of polyesters, and can be used in waxes, polishes and coatings.

88 Claims, No Drawings

U.S. PATENT DOCUMENTS

| | | | |
|---|---|---|---|
| 5,361,164 A | 11/1994 | Steliga | |
| 5,362,847 A | 11/1994 | Miller et al. | |
| 5,385,655 A | 1/1995 | Brent et al. | |
| 5,476,721 A | 12/1995 | Simeone et al. | |
| 5,519,151 A | 5/1996 | Petrov et al. | |
| 5,543,200 A | 8/1996 | Hargis et al. | |
| 5,547,550 A | 8/1996 | Kuntzburger et al. | |
| 5,576,095 A * | 11/1996 | Ueda et al. | 428/224 |
| 5,584,977 A | 12/1996 | Bachot et al. | |
| 5,603,818 A | 2/1997 | Brent et al. | |
| 5,631,340 A | 5/1997 | Olstein | |
| 5,632,958 A | 5/1997 | Kane et al. | |
| 5,637,657 A | 6/1997 | Anton | |
| 5,637,772 A | 6/1997 | Malik et al. | |
| 5,649,828 A | 7/1997 | Kawashima | |
| 5,650,483 A | 7/1997 | Malik et al. | |
| 5,654,450 A | 8/1997 | Malik et al. | |
| 5,663,289 A | 9/1997 | Archibald et al. | |
| 5,668,250 A | 9/1997 | Malik et al. | |
| 5,668,251 A * | 9/1997 | Malik et al. | 528/402 |
| 5,674,951 A | 10/1997 | Hargis et al. | |
| 5,681,890 A | 10/1997 | Tanaka et al. | |
| 5,685,755 A | 11/1997 | Zabasajja et al. | |
| 5,703,194 A | 12/1997 | Malik et al. | |
| 5,714,266 A | 2/1998 | Harrison et al. | |
| 5,728,669 A | 3/1998 | Tyerech | |
| 5,731,095 A | 3/1998 | Milco et al. | |
| 5,746,954 A | 5/1998 | Aikman, Jr. | |
| 5,750,482 A | 5/1998 | Cummings | |
| 5,753,316 A | 5/1998 | Brent et al. | |
| 5,789,505 A | 8/1998 | Wilkinson et al. | |
| 5,807,977 A | 9/1998 | Malik et al. | |
| 5,824,464 A | 10/1998 | Schell et al. | |
| 5,849,944 A | 12/1998 | Allen et al. | |
| 5,861,365 A | 1/1999 | Colurciello, Jr. et al. | |
| 5,865,851 A | 2/1999 | Sidoti et al. | |
| 5,908,473 A | 6/1999 | Weller et al. | |
| 5,912,291 A | 6/1999 | Sterling et al. | |
| 5,919,851 A | 7/1999 | Yamaguchi et al. | |
| 5,942,572 A * | 8/1999 | Chittofrati et al. | 524/805 |
| 5,952,422 A | 9/1999 | Chang et al. | |
| 5,955,414 A | 9/1999 | Brown et al. | |
| 5,965,659 A | 10/1999 | Kubo et al. | |
| 5,976,349 A | 11/1999 | Kuntzburger et al. | |
| 5,976,702 A | 11/1999 | Yoneda et al. | |
| 5,981,614 A | 11/1999 | Adiletta | |
| 5,993,907 A | 11/1999 | Aikman, Jr. | |
| 5,998,574 A | 12/1999 | Fishback et al. | |
| 6,010,539 A | 1/2000 | Del Pesco | |
| 6,015,838 A | 1/2000 | Stern et al. | |
| 6,015,914 A | 1/2000 | Sasaki et al. | |
| 6,020,451 A | 2/2000 | Fishback et al. | |
| 6,033,737 A | 3/2000 | Johnson et al. | |
| 6,036,735 A | 3/2000 | Carter et al. | |
| 6,037,483 A | 3/2000 | Malik et al. | |
| 6,065,153 A | 5/2000 | Underwood et al. | |
| 6,099,704 A | 8/2000 | Bacquet et al. | |
| 6,111,043 A | 8/2000 | Corpart et al. | |
| 6,114,045 A | 9/2000 | Juhue et al. | |
| 6,124,388 A | 9/2000 | Takai et al. | |
| 6,127,507 A * | 10/2000 | Santerre | 528/66 |
| 6,127,517 A | 10/2000 | Koike et al. | |
| 6,168,866 B1 | 1/2001 | Clark | |
| 6,177,196 B1 | 1/2001 | Brothers et al. | |
| 6,179,132 B1 | 1/2001 | Moya | |
| 6,180,243 B1 | 1/2001 | Johnson et al. | |
| 6,192,520 B1 | 2/2001 | Underwood et al. | |
| 6,200,457 B1 | 3/2001 | Durand et al. | |
| 6,200,732 B1 | 3/2001 | Tamura et al. | |
| 6,225,367 B1 | 5/2001 | Chaouk et al. | |
| 6,255,267 B1 | 7/2001 | Nayar et al. | |
| 6,255,384 B1 | 7/2001 | McCarthy et al. | |
| 6,383,651 B1 * | 5/2002 | Weinert et al. | 428/482 |

\* cited by examiner

FLUORINATED SHORT CARBON ATOM SIDE CHAIN AND POLAR GROUP CONTAINING POLYMER, AND FLOW, OR LEVELING, OR WETTING AGENTS THEREOF

FIELD OF THE INVENTION

One or more low carbon atom fluorocarbons of usually 7 carbon atoms or less are contained on a polymer generally having polar groups. The fluorocarbons generally exist as side chains with at least 25% of the hydrogen atoms being replaced by fluorine atoms. The polymer of the present invention is found unexpectedly to be an effective wetting, or flow, or leveling agent while producing little foam.

BACKGROUND OF THE INVENTION

U.S. Pat. No. 3,859,253 to Bourat et al. relates to polyoxetanes comprising a plurality of repeating units wherein the chain oxygen atoms of each recurring unit is attached to a chain methylene group of an adjacent recurring unit with, in addition, cross-linking via the other free valencies when the polymer contains repeating units.

U.S. Pat. No. 5,068,397 to Falk et al. relates to tris-perfluoroalkyl terminated neopentyl alcohols of the formula $(R_f—E_n—X—CH_2)_3CCH_2OH$ prepared from halogenated neopentyl alcohols and thiols of the formula $Rf—E_n—SH$, amines of the formula $R_f—E_n—NH—R$, alcohols of the formula $R_f—E_n—OH$, and perfluoro-acids or amides. The alcohols react with isocyanates to prepare urethanes; with acids or derivatives to prepare esters or carbonates; with epoxides to form ethers. Further, they may be converted to halide intermediates. The products all contain the residue of at least one $R_f$-neopentyl alcohol containing three perfluoroalkyl hetero groups.

U.S. Pat. No. 5,674,951 to Hargis et al. relates to coating compositions which use a polyoxetane polymer having —$CH_2$—O —$CH_2$—$R_f$ side chains where $R_f$ is a highly fluorinated alkyl or polyether. The coating compositions use polyisocyanates to create isocyanate terminated polymers from the poly(oxetane) and from various polyols from alkylene oxides or polyester polyols. These can be reacted together to form block copolymer structures or can be linked together when the coating is crosslinked. A preferred method is to use blocked isocyanate groups. Another preferred embodiment is to use the composition as an abrasion resistant coating for glass run channels.

U.S. Pat. No. 5,807,977 to Malik et al. relates to fluorinated polymers and prepolymers derived from mono-substituted oxetane monomers having fluorinated alkoxymethylene side-chains and the method of making these compositions. The mono-substituted fluorinated oxetane monomers having fluorinated alkoxymethylene side-chains are prepared in high yield by the reaction of a fluorinated alkoxide with either 3-halomethyl-3-methyloxetane pre-monomers. It also relates to copolymers of oxetane and tetrahydrofuran.

U.S. Pat. No. 5,998,574 to Fishback et al. relates to a polyol composition comprising: (A) a polytetramethylene ether glycol, and (2) a difunctional active hydrogen compound-initiated polyoxyalkylene polyether polyol having a degree of unsaturation of not greater than 0.04 milliequivalents per gram of said polyether polyol.

U.S. Pat. No. 6,020,451 to Fishback et al. relates to a polyol composition comprising: (A) a polytetramethylene ether glycol, and (2) a difunctional active hydrogen compound-initiated polyoxyalkylene polyether polyol having a degree of unsaturation of not greater than 0.04 milliequivalents per gram of said polyether polyol.

U.S. Pat. No. 6,127,517 to Koike et al. relates to the polymerization of hexafluoropropene oxide (HFPO) in a polymerization initiator solution of the formula: $CsCF_2$—$R_f$—$CF_2OCs$ wherein $R_f$ is a perfluoroalkylene group which may have an ether bond in an aprotic polar solvent provided that the initiator solution is first treated by adding a perfluoroolefin thereto at a sufficient temperature for the removal of protonic substances, cesium fluoride and hydrogen fluoride. This simple treatment restrains chain transfer reaction, and the process is successful in producing a difunctional HFPO polymer having a high degree of polymerization while suppressing formation of a monofunctional HFPO polymer.

U.S. Pat. No. 6,168,866 to Clark relates to a curable fluorine-containing coating composition comprising: (i) an amino resin; (ii) an addition fluoropolymer comprising a copolymer of a fluorinated monomer having a fluorocarbon group of at least 3 carbons, and a non-fluorinated monomer having a crosslinking group capable of reacting with said amino resin at elevated temperatures; and (iii) a hardening agent capable of crosslinking with said amino resin at elevated temperatures.

Heretofore, non-polymeric molecules containing fluorinated and polar groups were used as wetting, or flow, or leveling agents; however, many of these materials have been shown to bioaccumulate thereby greatly limiting their utility.

SUMMARY OF INVENTION

The partial or fully fluorinated short carbon atom side chain containing polymers of the present invention unexpectedly have good wetting, or flow, or leveling properties. The types of polymers are numerous and include polymers derived from cyclic ethers, poly(acrylates), poly(methacrylates), hydroxyl terminated poly(acrylates) or poly(methacrylates), polyolefins, polymers derived from vinyl substituted aromatic monomers such as styrene, polyesters, polyurethanes, polyamides, polyimides, polysiloxanes, and the like with polyoxetane being preferred. The polymers have at least one group that is polar which can be an anionic group, a cationic group, or a nonionic group. The polymer can also be amphoteric containing both anionic and cationic groups.

Furthermore, the polymers of the present invention can be caused to react with another monomer or with another polymer to impart effective wetting, or flow, or leveling properties to a coating prepared therefrom. Alternatively, the polymers of the present invention can be used as an additive with other polymers, copolymers, compositions, etc. to provide improved wetting, or flow, or leveling properties. Compared to molecules used typically as wetting, or flow, or leveling agents, the materials set forth in the present invention have relatively little propensity to cause foaming. This is often a desirable attribute of a wetting, flow, or leveling agent.

DETAILED DESCRIPTION OF THE INVENTION

The fluorinated short carbon chain compounds of the present invention are generally located on polymers as side chains thereof. These polymers, which contain one or more polar groups are generally dispersible or soluble in water and various hydrocarbon solvents and unexpectedly function as wetting, or flow, or leveling agents providing good optical properties to a coating such as high gloss and good distinctness of image, and thus can be blended with a wide variety of solutions, waxes, polishes, coatings, blends and the like.

Polymers of the present invention contain fluorinated carbon groups generally represented by the formula $R_f$. The $R_f$ groups can be part of the monomer which is reacted to form the polymer or they can be reacted with an already formed polymer. Alternatively, a polymer containing a $R_f$ group such as a fluorinated polyoxetane can be reacted with a polymer or monomer to form a copolymer which thus contains a plurality of pendant short chained $R_f$ groups thereon. Examples of a non-$R_f$ containing copolymer portion are various cyclic ethers, various polyesters, various acrylic polymers, various polysiloxanes, various polyamides, various polyurethanes, and various polymers made from vinyl substituted aromatic monomers.

A wide variety of fluorine-containing polymers can be utilized as generally set forth by the following description:

The polymer can be comprised of repeat units (with repeat units being greater than or equal to 2) of a variety of monomers including cyclic ethers, acrylates, olefins and vinyl moieties. The most preferred monomers are cyclic ethers (including fluorinated cyclic ethers such as those based on hexafluoropropylene oxide) such as oxetanes, and oxiranes. Other preferred monomers include acrylates, vinyls including styrenics, silanes, and siloxanes, as well as polyester forming monomers, polyamide forming monomers, polyimide forming monomers, and polyurethane forming monomers. The polymer may be of the copolymer type comprised of, but not limited to, the aforementioned monomers. The copolymer may be of the statistical or block type. The average degree of polymerization should be at least 2 as to about 100 or 200, and preferably from 2 to about 10 or 20, or 30.

The polymer may contain more than one $R_f$ type of group and the types of $R_f$, independently, can be the same or different and are fluorinated alkyl groups such as a linear alkyl group having a main chain of about 7 carbon atoms or less, desirably from about 1 to about 5 or 6 carbon atoms, and preferably 2, 3, or 4 carbon atoms. The $R_f$ alkyl group can be branched. When branched, the longest chain is composed of 7 carbon atoms or less with each branch containing a maximum total of 3 carbon atoms or less. $R_f$ whether linear or branched has at least one carbon atom bonded to at least one fluorine atom. The total amount of fluorine atoms in each $R_f$ group is generally at least 10% or 25%, desirably at least 50% or 75%, and preferably at least 80%, 85%, 90%, or 95%, or even 100% (perfluorinated) of the non-carbon atoms with any remaining non-carbon atoms or nonfluorine atoms being H, or I, or Cl or Br.

The pendant or side chain $R_f$ group can be present on all the monomers comprising the polymer or on a selected few with a preferable range of about 50 to 100% of monomers comprising the polymer containing a pendant or side chain $R_f$ group. A preferred polymer contains one $R_f$ group per repeat unit. The $R_f$ group can be bonded directly to the polymer, or desirably is covalently bonded through another linking moiety or group bonded to the polymer such as a hydrocarbyl, a sulfonyl, an ester, an alkyl sulfide, or the like. A desired moiety is alkyl ether such as

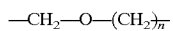  (Formula 1)

where n is from about 1 to about 6 with 1 or 2 being preferred.

Examples of polar groups covalently bonded to the polymer include anionic groups such as $-CO_2^-$ (Carboxylate), $-SO_3^-$ (Sulfonate), $-OSO_3^-$ (Sulfate), $-OPO_3^-$ (Phosphate), and $-ONO_2^-$ (Nitrate). Cationic counterions groups associated with the just noted anionic polar groups include $Li^+$ (lithium), $Na^+$ (sodium), $K^+$ (potassium), $Cs^+$ (cesium) and ammonium salts of the general formula, $NH_{4-x}R_x^+$ where R is typically a hydrocarbyl radical (e.g. a hydrocarbon radical) having from 1 to 10 or 18 carbon atoms and X is 0 to 3, or a quaternary ammonium salt.

Cationic polar groups covalently bonded to the polymer include $NH_{4-x}R_x^+$ (Ammonium), or a quarternary ammonium and $PH_{4-x}R_x^+$ (Phosphonium) where X is as noted above. Anionic counterions groups connected to said cationic polar groups include $F^{31}$ (fluoride), $Cl^-$ (chloride), $Br^-$ (bromide), $I^-$ (iodide), and $BF_4^-$ (tetrafluoroborate).

Nonionic polar groups include various polyethers having from 1 to about 100 and preferably from about 2 to about 25 repeat units (n) include $-O-(CH_2CH_2O)_n-H$ (poly (ethylene oxide)), $-O-(CH(CH_3)CH_2O)_n-H$ (poly (propylene oxide)), various polyether copolymers, carbonyl, carboxyl, nitrile, thiol, or cyano, or $-OH$ (hydroxyl).

Naturally, when a cationic polar group is utilized, it is utilized in conjunction with an anion to form a cation-anion salt, and conversely when an anion end group is utilized it is utilized in conjunction with a cation end group to form an anion-cation salt.

The type of polar group bonded covalently to the polymer can also be of a mixed anionic/cationic type forming an amphoteric-type polymer. Examples include covalent bonded cationic amine groups and anionic surfactants such as set forth in McCutheon's Volume 1: Emulsifiers & Detergents, North American Edition, The Manufacturing Confectioner Publishing Co., Glen Rock, N.J., 1999, hereby fully incorporated by reference.

Preferably, the polar group(s) are covalently bonded to the end(s) of the polymer; however, the polar group(s) can be covalently bonded at any location along the polymer chain (backbone). The number of polar groups bonded covalently to the polymer can be 1 to about 10 and preferably about 2.

The polar groups can be added by (i) end groups introduced through polymerization (from initiators or chain transfer agents), (ii) modification of aforementioned end groups in (i), (iii) specific reactions on the polymer such as grafting (examples are photografting, radiation grafting and oxidation), (iv) addition reactions (such as that produced by condensation of a polar group-containing isocyanate with a hydroxyl group on the polymer), (v) substitution or metathesis (for example, alkyl halide displacement with $AgBF_4$), and (vi) preferably, esterification of a hydroxyl group with sulfuric acid. Such reactions are known to the art and to the literature.

A preferred class of polymers are those derived from cyclic ethers generally containing from 2 to 5 carbon atoms in the ring and optionally substituted alkyl groups thereon containing from 1 to about 20 carbon atoms. Examples of such cyclic ethers include oxirane (epoxy) functionality such as epichlorohydrin, ethylene oxide, butyl glycidylether, and perfluorooctyl propylene oxide as well as alkyl substituted oxiranes having from 1 to about 20 carbon atoms or mixtures thereof; monomers having a 4-membered cyclic ether group such as oxetane, 3,3-bis(chloromethyl)oxetane, 3,3-bis (bromomethyl)oxetane, and, 3,3-bromo methyl(methyl) oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3- dioxalane as well as trioxane and caprolactone. A preferred polymer is derived from fluorosubstituted short carbon chain oxetane monomers as will be more fully discussed hereinbelow.

A class of preferred polymers include the various acrylic polymers such as for example, the various poly(alkyl acrylates) or the various poly(alkyl methacrylates) wherein the alkyl portion has from 1 to 18 carbon atoms with 1 to 4 carbon atoms being preferred and wherein the "meth" group can be substituted by a $C_2$ to $C_4$ alkyl. Still other suitable acrylic polymers include the various hydroxyl substituted poly(alkyl acrylates) and hydroxy substituted poly(alkyl methacrylates) wherein the alkyl group is as noted immediately above. Such polymers generally have from about 2 to about 100 repeat units and desirably from about 2 to about 10 or 20 or 30 repeat units. The preparation of such acrylic polymers is known to the literature and to the art. Example of suitable acrylate monomers include ethyl acrylate, propyl acrylate, butyl acrylate, hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethylhexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethylhexyl acrylate, ethyl acrylate, and the like. Hydroxyl alkyl acrylates and methacrylates include hydroxyethyl and hydroxy propylacrylates and methacrylates, and the like, and are also preferred. Examples of still other acrylates are set forth in U.S. Pat. No. 5,055,515, hereby fully incorporated by reference.

Another class of polymers are those derived from vinyl substituted aromatics having a total of from about 8 to about 12 carbon atoms such as styrene, alpha-methyl styrene, vinyl pyridine, and the like, and copolymers thereof such as those made from conjugated dienes having from 4 to about 12 carbon atoms such as butadiene, isoprene, and the like. The $R_f$ group is generally located on the ring compound. Such polymers can generally have from about 2 to about 100 and desirably from about 2 to about 10 or 20 or 30 repeat units. The preparation of such polymers is known to those skilled in the art as well as to the literature.

The polymer can also be a polyester. Polyesters are generally made by the condensation reaction of one or more dicarboxylic acids, containing a total of from about 2 to about 12 carbon atoms and preferably from about 3 or 4 to about 10 carbon atoms and include aliphatic as well as aromatic acids, with glycols or polyols having a total of from about 2 to about 20 carbon atoms. Polyesters can also be made by the ring opening polymerization of cyclic esters having from 4 to about 15 carbon atoms such as caprolactone, and the like. While numerous types of polyesters exist, such as set forth herein below, preferred polyesters include poly(ethylene terephthalate), poly(butylene terephtalate), and the like. The preparation of polyesters is well known to the art and to the literature.

The polyamides constitutes another class of polymers which can be utilized. The polyamides are made from cyclic amides having a total of from about 4 to about 20 carbon atoms such as polyamide 4 (polybutyrolactam), polyamide 6 (polycaprolactam), polyamide 12 (polylauryl lactam), or polyamides made by the condensation reaction of a diamine monomer having a total of from about 4 to about 15 carbon atoms with a dicarboxylic acid having from about 4 to about 15 carbon atoms such as polyamide 6,6 (a condensation product of adipic acid and hexamethylenediamine), polyamide 6,10 (a condensation product of sebacic acid and hexamethylenediamine), polyamide 6,12, polyamide 12,12, and the like with polyamide 6,6, and polyamide 6,12, being preferred. Such polyamides often have from about 2 to about 100 and desirably from about 2 to about 10 or 20 or 30 repeat units. The preparation of such polyamides is well known to the art and to the literature. Examples of the above polyamides as well as others are set forth in U.S. Pat. No. 5,777,033, which is hereby fully incorporated by reference.

The polysiloxanes still constitute another class of polymers which can be utilized in the present invention. The polysiloxanes are generally made from dihydroxysilane which react with each other by dehydration and dehydrochlorination. The side groups of the monomers are generally an alkyl having from 1 to about 20 carbon atoms. The number of repeat groups of the polysiloxanes is generally from about 2 to about 100 and desirably from about 2 to about 10 or 20 or 30. The preparation of the polysiloxanes is well known to the art and to the literature. Examples of suitable polysiloxanes are set forth in U.S. Pat. No. 4,929,664, which is hereby fully incorporated by reference.

The preparation of polyurethanes generally proceed in a stepwise manner as by first reacting a hydroxyl terminated polyester or polyether with a polyisocyanate such as a diisocyanate and optionally, subsequently chain extending and/or crosslinking the same. The polyether monomers of the intermediate can generally have from 2 to about 6 carbon atoms whereas the polyester intermediates can be made from diols and dicarboxylic acids as noted herein above with regard to the preparation of the various polyesters. Suitable diisocyanates generally have the formula $R(NCO)_X$ where X equals 2, 3 or 4 with 2 being preferred. R can be an aliphatic, an aromatic, or combinations thereof having from about 4 to about 20 carbon atoms. Such polyurethanes generally have from about 2 to about 100 and desirably from 2 to about 10 or 20 or 30 repeat units. The preparation of polyurethanes are well known to the art and to the literature. Examples of suitable polyurethanes are set forth in U.S Pat. No. 4,975,207, which is hereby fully incorporated by reference.

Polyfluorooxetanes

As noted above, desired fluorine containing polymers are those wherein the repeat units are obtained from cyclic ethers. Polymerization of such ethers generally proceeds by a cationic or an anionic mechanism. A desired fluorine containing polymer of the present invention is an oxetane polymer containing fluorinated side chains. The monomers as well as the polyoxetanes can be prepared in a manner as set forth herein below, and also according to the teachings of U.S. Pat. Nos. 5,650,483; 5,668,250; 5,688,251; and 5,663,289, hereby fully incorporated by reference. The oxetane monomer desirably has the structure

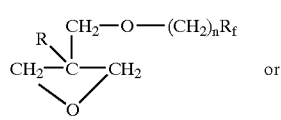

2A

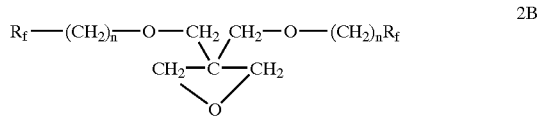

2B wherein as noted above, n is an integer from 1 to about 3 or to about 6 and $R_f$, independently, on each monomer is a linear or branched, unsaturated, or preferably saturated alkyl group of 1 to about 7 carbon atoms with a minimum of 25, 50, 75, 80, 85, 90 or 95, or preferably perfluorinated i.e. 100 percent of the H atoms of said $R_f$ being replaced by F, and optionally up to all of the remaining H atoms being replaced by I, Cl or Br. $R_f$ desirably has from 1 to about 5 or 6 carbon atoms and preferably contains 2 3, or 4 carbon atoms. $R_f$ can either contain a linear alkyl group or a branched alkyl group. When it is a branched group, the main chain contains from 1 to 7 carbon atoms and each branch chain can contain up to 3 carbon atoms as well, or the main chain contains from 1 to 6 carbon atoms and each branch chain independently has 1 or 2 carbon atoms, or the main chain contains from 2 to about 4 carbon atoms and each branch chain independently contains 1 or 2 carbon atoms. R is an alkyl from 1 to 6 carbon atoms with methyl or ethyl being preferred.

Preferably, the $R_f$ group is present on the monomer used to prepare the polymer, but the $R_f$ group can be added after the polymer is formed. For example, a typical reaction scheme involves the condensation of a commercially available $R_f$ alcohol with a carboxylic acid group pendant or side chain on the polymer backbone.

The above polymers derived from the noted oxetane monomers generally have repeat units of the following structure

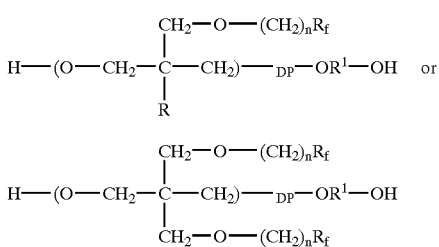

where n, $R_f$, and R are as described above. $R^1$ is an alkyl having from 1 to about 18 carbon atoms and is generally derived from a diol used in preparing the polymer. As noted above, polymers of formulas 3A and 3B are obtained by cationic polymerization.

The average degree of polymerization (DP) of polyoxetane (polymer) of the fluorinated polyoxetanes is generally from about 1 to about 500, desirably from about 2 or 3 to about 50 or 100, and preferably from about 4 to about 10, 20, or 30.

The hydroxyl groups can be converted to other polar groups through subsequent chemical reaction in a manner as noted above. Preferably, the hydroxyl groups can be converted to sulfate by esterification with fuming sulfuric acid.

While the following representative examples relate to the preparation of specific FOX (fluorooxetane) monomers, (i.e. mono 3-FOX, mono 7-FOX, and bis 3-FOX). Other mono or bis FOX monomers can be prepared in a similar manner.

EXAMPLE M1

Preparation of 3-FOX Monomer 3-(2,2,2-Trifluoroethoxymethyl)-3-Methyloxetane

Synthesis of the 3-FOX oxetane monomer is performed as follows:

A dispersion of 50 weight percent (2.8 grams, 58.3 mmol) sodium hydride in mineral oil, was washed twice with hexanes and suspended in 35 milliliters of dimethyl formamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethyl formamide was added and the mixture was heated at 75° C.–85° C. for 20 hours, when $^1$H MNR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, brine, dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90 percent. The oil was distilled at 30° C. and 0.2 millimeters mercury pressure to give 4.3 grams of analytically pure 3-FOX, corresponding to a 60 percent yield. The analyses of the product were as follows: IR (KBr) 2960–2880, 1360–1080, 990, 840 cm$^{-1}$; $^1$H NMR δ1.33 (s, 3H), 3.65 (s, 2H), 3.86 (q, J=8.8 Hz, 2 H), 4.35 (d, J=5.6 Hz, 2 H), 4.51 (d, J=5.6 Hz, 2 H); $^{13}$C NMR δ20.72, 39.74, 68.38 (q, J=40 Hz), 77.63, 79.41, 124 (q, J=272 Hz). The calculated elemental analysis for $C_7H_{11}F_3O_2$ is: C, 45.65; H, 6.02; F, 30.95. The experimental analysis found: C, 45.28; H, 5.83; F, 30.59.

EXAMPLE M2

Preparation of 7-FOX Using PTC Process 3-(2,2,3,3,4,4,4-Heptafluorobutoxymethyl)-3-Methyloxetane A 2 L, 3 necked round bottom flask fitted with a reflux condenser, a mechanical stirrer, a digital thermometer and an addition funnel was charged with 3-bromomethyl-3-methyloxetane (351.5 g, 2.13 mol), heptafluorobutan-1-ol (426.7 g, 2.13 mol), tetrabutylammonium bromide (34.4 g) and water (85 mL). The mixture was stirred and heated to 75° C. Next, a solution of potassium hydroxide (158 g, 87% pure, 2.45 mol) in water (200 mL) was added and the mixture was stirred vigorously at 80°–85° C. for 4 hours. The progress of the reaction was monitored by GLC and when GLC analysis revealed that the starting materials were consumed, the heat was removed and the mixture was cooled to room temperature. The reaction mixture was diluted with water and the organic layer was separated and washed with water, dried and filtered to give 566 g (94%) of crude product. The crude product was transferred to a distillation flask fitted with a 6 inch column and distilled as follows:

Fraction #1, boiling between 20° C. –23° C./10 mm-Hg, was found to be a mixture of heptafluorobutanol and other low boiling impurities, was discarded;

Fraction #2, boiling between 23° C. and 75° C./1 mm-Hg, was found to be a mixture of heptafluorobutanol and 7-FOX, was also discarded; and Fraction #3, boiling at 75° C./1 mm-Hg was >99% pure 7-FOX representing an overall yield of 80.2%

NMR and GLC data revealed that 7-FOX produced by this method was identical to 7-FOX prepared using the sodium hydride/DMF process.

Example M3 relates to the preparation and properties of 3,3-bis(2,2,2-trifluoroethoyxmethyl) oxetane (B3-FOX).

EXAMPLE M3

Sodium hydride (50% dispersion in mineral oil, 18.4g, 0.383 mol) was washed with hexanes (2×) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2×). The combined organic extracts were washed with brine, 2% aqueous HCl, water, dried (MgSO$_4$), and evaporated to give 17.5 g (100%) of 3,3-bis-(2,2,2-trifluoroethoxymethyl) oxetane as an oil containing DMF (<1%). The oil was purified by bulb-to-bulb distillation at 42–48° C. (10.1 mm) to give 15.6 g (79%) of analytically pure B3-FOX, colorless oil: IR (KBr) 2960–2880, 1360–1080, 995, 840 cm$^{-1}$; $^1$H NMR δ3.87 (s 4H), 3.87 (q,J=8.8 Hz, 4H), 4,46 (s, 4H); $^{13}$C NMR δ43.69, 68.62 (q,J=35 Hz), 73.15, 75.59, 123.87 (q,J=275 Hz); $^{19}$F NMR δ−74.6(s). Anal. Calcd. for $C_9H_{12}F_6O_3$; C,38.31;H, 4.29; F, 40.40. Found: C, 38.30; H, 4.30; F, 40.19.

A copolymer of two or more FOX monomers can be synthesized to produce desirable products. Additionally, copolymers with non-fluorinated cyclic ethers can be prepared, preferably with oxetane and/or tetrahydrofuran (THF) monomers.

Preparation of polymers or copolymers from the fluorinated oxetane monomers described herein can be made in accordance with U.S. Pat. Nos. 5,650,483; 5,668,250; 5,668251; or 5,663,289; hereby fully incorporated by reference.

EXAMPLE P1

Homopolymerization of 3-FOX 3-(2,2,2-Trifluoroethoxymethyl)-3-methyloxetane

A solution of 34.3 milligrams (0.38 mmol) of butane-1,4-diol and 109.7 milligrams (0.77 mmol) of boron trifluoride etherate in 4 grams of methylene chloride was stirred at ambient temperature for 15 minutes under nitrogen in a dry polymerization flask. The solution was cooled to 1.5° C. and a solution of 1.20 grams (6.52 mmol) of 3-(2,2,2-trifluoroethoxymethyl)-3-methyloxetane in 1.3 grams of methylene chloride was added, The resultant solution was stirred for 5 hours at 1°–2° C. at which time $^1$H NMR analysis of an aliquot indicated that the starting oxetane had been consumed. The solution was warmed to ambient temperature and quenched with water. The organic layer was washed with brine, 2 weight percent aqueous hydrochloric acid, and evaporated to give 1.053 grams of poly-3-(2,2,2-trifluoroethoxymethyl)-3-methyloxetane as an oil, corresponding to a 88 percent yield. The polymer analyses were: DSC Tg −45° C., decomposition temperature was greater than 200° C.; GPC $M_n$=7376, $M_w$=7951, polydispersity 1.08, inherent viscosity 0.080 dL/g; Equivalent Weight by $^1$H NMR=6300; $^1$H NMR δ0.95 (s, 3H), 3.26 (m, 4H), 3.52 (s, 2H) 3.84 (q. 2H); $^{13}$C NMR δ17.57, 42.09, 69.30 (q, J=33 Hz), 74.42, 75.90, 125.18 (q, J=280 Hz).

While a polyoxetane homopolymer is preferred, optionally a copolymer derived from one or more different monomers can be used. The polyoxetane copolymer can be made from comonomers such as cyclic ethers having total of from 2 to about 5 carbon atoms in the ring, for example an epoxy (oxirane) functionality such as epichlorohydrin, propylene oxide, ethylene oxide, butyl glycidylether, and perfluorooctyl propylene oxide as well as alkyl substituted oxiranes having from 1 to about 20 carbon atoms or mixtures thereof; monomers having a 4-membered cyclic ether group such as 3,3-bis (chloromethyl)oxetane, 3,3-bis(bromomethyl) oxetane, and, 3,3-bromo methyl(methyl)oxetane; monomers having a 5 membered cyclic ether group such as tetrahydrofuran, tetrahydropyran, and 2-methyltetrahy- drofuran; and the like. Still other suitable monomers include 1,4-dioxane, 1,3-dioxane and 1,3-dioxalane as well as trioxane and caprolactone. The number of alkyl substituted carbon atoms substituted on any ring carbon atom is from 1 to about 20. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers. A preferred copolymer is made from tetrahydrofuran.

EXAMPLE CP (FOX-THF)

An Example of Preparing a Poly-FOX-THF Copolymer is as Follows

A 10 L jacketed reaction vessel with a condenser, thermocouple probe, and a mechanical stirrer was charged with anhydrous methylene chloride (2.8 L), and 1,4-butanediol (101.5 g, 1.13 moles). BF$_3$THF (47.96 g, 0.343 moles) was then added, and the mixture was stirred for 10 minutes. A solution of 3-FOX, 3-(2,2,2-trifluoroethoxyl-methyl)-3-methyloxetane, made in accordance with U.S. Pat. Nos. 5,650,483; 5,668,250; 5,663,289; or 5,668251, (3,896 g. 21.17 moles) in anhydrous methylene chloride (1.5 L) was then pumped into the vessel over 5 hours. The reaction temperature was maintained between 38 and 42° C. throughout the addition. The mixture was then stirred at reflux for an additional 2 hours, after which $^1$H NMR indicated >98% conversion. The reaction was quenched with 10% aqueous sodium bicarbonate (1 L), and the organic phase was washed with 3% aq. HCl (4 L) and with water (4 L). The organic phase was dried over sodium sulfate, filtered, and stripped of solvent under reduced pressure to give 3,646 g (91.2%) of title glycol, a clear oil. NMR: The average degree of polymerization (DP) was determined by end group analysis. The hydroxl functional end groups were reacted with trifluoroacetic anhydride at room temperature and the derivative compound characterized by $^1$H-NMR spectroscopy. The degree of polymerization was calculated by the ratio of the area of the methyl resonance and the area of terminal methylene. The DP was 15.2 which translates to an equivalent weight of 2804. The THF content of this glycol, as determined by $^1$H NMR, was 2.5% wt THF (6.2% mole THF). This example was included to teach how to polymerize partially fluorinated oxetane polymers.

The polymers such as those made from various cyclic ethers, for example, oxetane, oxirane, or copolymers thereof, with another cyclic ether or with a polyester such as those set forth herein below, often contain a hydroxyl or acid end group. Optionally, but preferably, such end groups are converted to a polar end group such as an anion for example —CO$_2^-$ (Carboxylate), —SO$_3^-$ (Sulfonate), —OSO$_3^-$ (Sulfate), —OPO$_3^-$ (Phosphate), or —ONO$_2^-$ (Nitrate), and an appropriate countercation; or a cation such as ammonium, etc., and an appropriate counteranion; or a nonionic end group, etc. in a manner, e.g. as set forth in any of the different routes noted herein above. For example, sulfuric acid can be added to a hydroxyl end group to convert the same to a sulfate anion. Subsequently, a countercation can be added thereto.

The polymers of the present invention, which contain a short chain fluorinated $R_f$ group as well as one or more polar groups thereon, can be utilized as a wetting, or flow, or leveling agent. These polymers can subsequently be reacted with another polymer and/or curing agent to form a copolymer or a cured polymer or a cured copolymer. Examples of suitable monomers forming a copolymer include the above noted monomers such as the various cyclic ethers, the various acrylic monomers, the various vinyl substituted aromatic monomers, the various polyester forming monomers, the various polyurethane forming monomers, or the various polyamide forming monomers, or the various siloxane monomers, all of which are hereby fully incorporated by reference. The various curing or crosslinking agents are known to the literature and to the art and include the various amino resins as set forth herein below. These copolymer forming monomers and/or curing agents are reacted with the wetting, or flow, or leveling agents subsequent to formation thereof.

Poly(Flouroocetane-ester) Copolymers

As noted above, copolymers of the polyoxetane with another monomer or polymer can be made. Preparation of various polyoxetane-ester copolymers are set forth in U.S. application Ser. Nos. 09/035,595, filed Mar. 5, 1998; 09/244, 711, filed Feb. 4, 1999; 09/384,464, filed Aug. 27, 1999; and 09/698,554, filed Oct. 27, 2000, which are hereby fully incorporated by reference. A desired copolymer is that of an oxetane and an ester. The polyester can be preformed and reacted with the polyoxetane or formed in situ by reacting ester forming monomers with the polyoxetane. However, it is highly desirable to prereact, endcap, the hydroxyl terminated fluorinated polyoxetane polymer, or copolymer, (polyoxetane block) with a polycarboxylic acid or anhydride thereof for ease of incorporation of the fluorinated moiety into a polyester via an ester linkage. This route increases the rate of incorporation, and generally the percentage of fluorinated polyoxetane that is incorporated into the polyester or other polymer. Subsequent thereto, the polyester block can be formed. A preferred route to form the ester linkage is to react the hydroxyl terminated partially fluorinated polyoxetane with at least 2 moles of a carboxylic acid from a polycarboxylic acid having from 3 to 10 or 30 carbon atoms such as malonic acid, or succinic acid, or glutaric acid, or adipic acid, or pimelic acid, or maleic acid, or fumaric acid, or cyclohexane dioic acid, and the like, an anhydride, thereof, per equivalent of hydroxyl groups from any polyol component under conditions effective to form an ester condensation product from the hydroxyl group of the polyoxetane and the carboxylic acid group of the polycarboxylic acid or its anhydride. More desirably, the equivalents of carboxylic acid groups are at least 2.05 or 2.1 equivalents. The reaction temperature is generally from about 110 to about 275° C. and desirably from about 215° C. to about 250° C. In a preferred embodiment, the amount of non-fluorinated polyol is small or zero to force the carboxylic acid groups to react with the hydroxyl group of the partially fluorinated polyoxetane. Desirably, the equivalents of hydroxyls from non-fluorinated polyols are less than 0.5, more desirably less than 0.2 and preferably less than 0.1 per equivalent of hydroxyls from the partially fluorinated polyoxetane until after at least 70, 80, 90, or 95 mole percent of the hydroxyl groups of the polyoxetane are converted to half esters with the polycarboxylic acid. It is also acknowledged that the percentage of the polymer with said oxetane repeating units and the oxetane repeating units themselves may not be uniformly distributed through the bulk of the polyester. Said oxetane repeating units are usually disproportionately present at the surface of the coating due to the low surface tension of those repeat units. The amount of surface fluorine groups can be determined by XPS (x-ray photoelectron spectroscopy).

The polyester resins are made by a condensation polymerization reaction in the presence of heat and usually a catalyst with polycarboxylic acids or anhydrides thereof and polyols. Alternatively, internal or cyclic esters can be utilized containing a total of from about 4 to about 15 carbon atoms such as caprolactone. Reaction temperatures generally range from about 110° C. to about 275° C., and desirably from about 215° C. to about 250° C. with suitable catalysts being such compound as dibutyl tin oxide and the like. Reaction temperatures of the cyclic esters are generally lower, such as from about 10° C. or 20° C. to about 30° C. or 50° C. or 100° C. Preferred polycarboxylic acids are the dicarboxylic acids and their anhydrides. Fatty monobasic oils or fatty acids, monohydroxy alcohols and anhydrides can be present. The polyester may contain active hydrogen atoms, e.g., carboxylic acid groups and/or hydroxyl groups for reaction with the amino resin or can contain unsaturation for crosslinking by another mechanism such as copolymerization with ethylenically unsaturated monomers. Examples of some acids to use to form the alkyd resin or reactive polyester are adipic acid, cyclohexane dioic acid, azelaic acid, sebacic acid, terephthalic acid, isophthalic acid, phthalic anhydride, and so forth. Generally the aliphatic carboxylic acids have from about 3 to about 10 carbon atoms. Other carboxylic acids such as carbonic acid or phosgene may be used in lieu of carboxylic acids under appropriate conditions. The aromatic carboxylic acids generally have from about 8 or 10 to about 25 or 30 carbon atoms. The polyhydric alcohols (polyols) generally have from about 2 to about 20 carbon atoms and from about 2 to about 5 hydroxyl groups. Polymeric polyols such as formed from the polymerization of cyclic alkylene oxides may be used as a portion or all of the polyhydric alcohol. Polymeric polyols generally have number average molecular weights from 100 to 5,000 or 10,000. Examples of some polyhydric alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Mixtures of the polyols and polycarboxylic acids can be used. An example of a suitable reactive polyester is the condensation product of trimethylol propane, 2,2-dimethyl-1,3-propanediol, 1,4-cyclohexanedimethanol, isophthalic acid, and adipic acid, hereinafter "VR-248 resin". Mixtures of these reactive polyesters (alkyd resins) can be used. Alkyd resins are well known as shown by the "Encyclopedia of Polymer Science and Technology," Vol. 1, 1964, John Wiley & Sons, Inc., pages 663–734; "Alkyd Resins," Martens, Reinhold Publishing Corporation, New York, 1961 and "Alkyd Resin Technology," Patton, Interscience Publishers, a division of John Wiley and Sons, New York, 1962. Some unsaturated polycarboxylic acids and unsaturated polyols may be used in the condensation reaction.

The polyester segments of the polyester may also be polymerized from cyclic ethers typically containing 2 or 3 or 4 carbon atoms in the ring and an anhydride (e.g. an unsaturated anhydride) using double metal complex cyanide catalysts. These polyesters can be used with a carboxylic half ester functionalized polyoxetane because of the occurrence of ester interchange reactions whereby polyester polymers cleave to form carboxylic acid and hydroxyl end groups and then couple with other polyester fragments via an ester linkage. Generally any cyclic oxide can be utilized such as 1,2-epoxides, oxetanes, and the like, with the cyclic ether having a total of up to 18 carbons atoms, as for example 2 carbon atoms in the ring and up to 16 carbon atoms in the side chains. Such cyclic oxide monomers can also contain one or more aliphatic double bonds. Generally five-member unsaturated cyclic anhydrides are preferred, especially those having a molecular weight between 98 and 400. Mixed anhydrides can be used. Anhydrides include phthalic, itaconic, nadic etc. Halogenated anhydrides can also be used. Such polyesters are known to the art and described in U.S. Pat. No. 3,538,043 which is hereby incorporated by reference.

The number average molecular weight of the polyester polymer or block, whether preformed, or formed in situ, is desirably from about 100 to about 5,000 or 20,000. It is understood that in all these reactions, the possibility exists that some of the polyester molecules will not include any polyoxetane. The polyester compositions of the present invention can be formed by reacting the ester forming monomers in the presence of a derivative of the above noted fluorinated polyoxetane polymer, or copolymer which contains an ester linkage derived from the reaction of a polycarboxylic acid or anhydride with the fluorooxetane. Alternatively, a preformed polyester can be formed which is then reacted with the fluorinated polyoxetane polymer, or copolymer containing the noted ester linkage. In other words, the polyester can be formed or derived or polymerized in the presence of the polyfluorooxetane derivative or it can be initially polymerized and subsequently reacted as through a hydroxyl end group with a polyoxetane having the ester linkage thereon.

The amount of fluorinated polyoxetanes in said polyester is desirably from about 0.05 or 0.1 or 0.2 to about 10, 15 or 50 weight percent based on the weight of the polyester including the polyoxetane portion. The polyester can be diluted with other components (including non-fluorinated polyesters) while preparing a coating or other polymer composition. The repeating units from a polyester are desirably from about 50 to about 99.8 weight percent of the polyester and polyoxetane and more desirably from about 85 or 90 to about 99 weight percent.

Additionally other conventional additives may be formulated into the polyester-polyoxetane composition for particular applications. Examples include viscosity modifiers, antioxidants, antiozonants, processing aids, pigments, fillers, ultraviolet light absorbers, adhesion promoters, emulsifiers, dispersants, solvents, crosslinking agents, etc.

Since the poly(fluorooxetane-ester) copolymers described hereinabove generally contain a hydroxyl end group or can be formulated to readily contain such an end group, they can be utilized with such a polar group thereon. Alternatively, they can be reacted with various compounds to produce an anionic, cationic, nonionic, or amphoteric end groups in a manner as set forth hereinabove, and hereby fully incorporated by reference. Such poly(fluorooxetane-ester) copolymers containing one or more polar groups thereon, and often two polar groups, can be utilized as wetting agents, or flow agents, or leveling agents for various uses as set forth herein below. The ester portion of the poly(flurooxetane-ester) copolymers will generally act as a compatibilizing agent for the flurooxetane portion of the copolymer and improve solubility as well as incorporation into various other polymers. Such copolymers thus act as a non-fugitive wetting, or flow, or leveling agent.

Various polyfluorooxetane-polyester copolymers were made in the following manner.

EXAMPLE CP-I

Two different hydroxyl terminated fluorinated polyoxetane—THF copolymers were made in a manner as set forth in Example CP to prepare four different polyester materials. The first polyoxetane had 6 mole % repeating units from tetrahydrofuran (THF) with the rest of the polymer being initiator fragment and repeating units from 3-FOX where n=1, $R_f$ is $CF_3$, and R is $CH_3$. The number average molecular weight of the first polyoxetane was 3400. The second polyoxetane had 26 mole % of its repeating units from tetrahydrofuran with the residual being the initiator fragment and repeating units from 3-FOX. 3-FOX is also known as 3-(2,2,2-trifluoroethoxylmethyl)-3-methyloxetane.

EXAMPLE CP-II

Fox-Polyester Copolymers

The first and second fluorinated oxetane polymers of Example CP-I were reacted with at least a 2 equivalent excess (generally 2.05–2.10 excess) of adipic acid in a reactor at 455° F. for 3.5 hours to form a polyoxetane having the half ester of adipic acid as end groups. This half ester linkage will serve to chemical bond the polyoxetane to a subsequently in-situ formed polyester. In other words, this polyoxetane has a preformed ester linkage. NMR analysis was used to confirm that substantially all the hydroxyl groups were converted to the ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to 300° F.

The adipic acid functionalized polyoxetane was then reacted with additional diacids and diols to form polyester (VR-248) blocks. The diacids were used in amounts of 24.2 parts by weight of adipic acid and 24.5 parts by weight of isophthalic acid. The diols were used in amounts of 20.5 parts by weight cyclohexanedimethanol, 14.8 parts by weight neopentyl glycol, and 16.0 parts by weight trimethylol propane. The relative amounts of the adipate ester of the oxetane polymer and the polyester forming components was adjusted to result in polyesters with either 2 or 4 weight percent of partially fluorinated oxetane repeating units. The reactants were reacted in the same pot used to react the adipic acid but the reaction temperature was lowered to 420° F. The reaction time was continued until the calculated amount of water was generated. The finished batch sizes were from 20 to 30 gallons.

EXAMPLE CP-III

Fox-caprolactone Copolymers

This example relates to the reaction of caprolactone monomers in the presence of a fluorinated polyoxetane to generally form a block fluorinated polyoxetane-ester copolymer. The copolymer can contain a hydroxyl end group. However, inasmuch as the copolymer contains a lactone group, the same can be modified in a manner set forth hereinabove to contain other polar groups, for example an anion, or a cation, or both, or a nonionic, thereby rendering the copolymer more water soluble.

| PREPARATION OF A OXETANE CAPROLACTONE COPOLYMERS | | | | | | | |
|---|---|---|---|---|---|---|---|
| Compound | Scale | Ratio | MW | Moles | Mole Ratio | d (g/mL) | mL |
| 3-FOX | 100.0 | 1.0 | 184.15 | 0.54 | 50.34 | 1.150 | 87.0 |
| Caprolactone | | 0.54 | 114.14 | 0.47 | 43.86 | 0.886 | 60.9 |
| Methylene Chloride | | 0.53 | 84.93 | 0.62 | 57.85 | 1.330 | 39.8 |
| Neopentyl glycol | | 0.02812 | 104.15 | 0.03 | 2.50 | 1.017 | 2.8 |
| BF$_3$THF | | 0.015092 | 139.90 | 0.01 | 1.00 | 1.268 | 1.2 |
| Methylene Chloride | | 0.8 | 84.93 | 0.94 | 87.32 | 1.330 | 60.2 |
| Water | | 0.43 | 18.01 | 2.39 | 221.32 | 1.000 | 43.0 |
| Water | | 0.85 | 18.01 | 4.72 | 437.50 | 1.000 | 85.0 |
| Theoretical Yield (g) | 156.81 | | | | | | |
| Expected Yield, Low (g) | 141.13 | | | | | | |
| Expected Yield, High (g) | 148.97 | | | | | | |
| Solids Loading, % | 47.32 | | | | | | |
| | mL | | | | | | |
| Initial Volume | 191.71 | | | | | | |
| Volume after quench, ml | 294.86 | | | | | | |
| Volume after wash, mL | 336.86 | | | | | | |

To a 250 mL 3-necked round bottomed flask was added neopentyl glycol (2.81 grams, 0.03 moles), 53 mL methylene chloride, and BF$_3$THF (1.51 g, 0.01 moles). 3-FOX monomer (100 g, 0.54 moles) was added dropwise over 40 minutes. After two hours, proton-NMR analysis indicated polymerization of the 3-FOX monomer was complete with a degree of polymerization of 19.14. Caprolactone monomer (54 grams, 0.47 moles) was added dropwise over 25 minutes. The reaction mixture was then allowed to stir for 120 hours at 25° C. 80 grams of methylene chloride was then added, and the copolymer solution was washed with water until a neutral pH was obtained. Final yield was 141.15 grams, the caprolactone degree of polymerization was 15.85, and the hydroxyl equivalent weight was 2717.4.

As noted above, the various fluorinated polar group containing polymers of the present invention act as a flow, or a leveling, or a wetting agent. Desirably they are incorporated or tied up, in other words bound to another polymer as in the form of a copolymer or the like to prevent the fluorinated polymer from being fugitive, able to leach out, or otherwise be released from a composition such as a coating composition or any other composition wherein a plurality of compounds are contained. Other than being in the form of a copolymer, they can be cured after effectively serving as a flow, or leveling, or wetting agent and formed into a final product such as a coating, a laminate wherein the fluorinated polymer is contained on a substrate, or other article. The following thus relates to a curing poly(fluorooxetane-ester) copolymers which can contain a polar group thereon.

Cured Poly(Fluorooxetane-ester)Copolymers

As noted above, the polyoxetane-ester copolymer can be cured utilizing amino resins. Amino resins generally include alkylated benzoguanamine-formaldehyde, alkylated urea-formaldehyde, or preferably alkylated melamine-formaldehyde resin. Mixtures of these resins can be used. These amino resins are well known and include those set forth in "Aminoplastics," Vale et al, lliffe Books Ltd., London, 1964; "Amino Resins," Blair, Reinhold Publishing Corporation, New York, 1959, "Modern Plastics Encyclopedia 1980–1981," pages 15, 16 and 25 and "Encyclopedia of Polymer Science And Technology," John Wiley & Sons, Inc., Vol. 2, 1965, pages 1 to 94.

These materials are desirably cured at temperatures of at least 150° F., 200° F., 250° F. or 400° F. or more (66° C., 93° C., 121° C. or 204° C.) for effective times in the presence of a minor amount by weight of an acidic catalyst such as boric acid, phosphoric acid, acid sulfates, hydrochlorides, phthalic anhydride or acid, oxalic acid or its ammonium salts, sodium or barium ethyl sulfates, aliphatic or aromatic sulfonic acids such as p-toluene sulfonic acid (preferred), methane sulfonic acid and the like. It is important that properties such as stain resistance imparted by the polyester and amino resin containing repeat units derived from an oxetane monomer having pendant fluorinated groups be optimized by controlling things such as glass transition temperature, crosslink density and the presence of molecules that may act as plasticizers or other molecules that may transport or attract staining molecules in the coating. Prior to curing flattening agents or other additives can be added to the mixture of the reactive polyester and amino resin.

The amount of the various components in the coating will be generally specified in relationship to 100 parts by weight of the polyester-oxetane resin and the amino resin crosslinking agent. The weight ratio of polyester-oxetane resin (neat) to amino resin (neat) can vary widely but desirably is from about 10:90 to 90:10 and more desirably from about 20:80 to 80:20; or 70:30 to 30:70, or 60:40 to 40:60. Generally, it is more desirable to match the moles of reactive groups on the polyester-oxetane to within 10% to 20% to the number of moles of reactive groups on the amino resin. The number of moles of reactive groups can be determined by dividing the weight of the component by the equivalent weight for the component. The term "neat" after polyester-oxetane and amino resin does not exclude using polyesters and amino resins that are received dissolved in solvents or dispersed in water but rather specifies that the amount used is to be recalculated based on the weight without the solvent. For the purposes of this disclosure no distinction will be made whether the amino resin crosslinks the polyester resin or vice versa.

The amount of carriers and/or solvent(s) in the coating composition can vary widely depending on the coating viscosity desired for application purposes, and solubility of the components in the solvent. The solvent(s) can be any conventional solvent for polyester-amino resin systems. These carriers and/or solvents include but are not limited to water, alkyl alcohols of 1 to 10 carbon atoms, ketones of from 3 to 15 carbon atoms e.g. methyl ethyl ketone or methyl isobutyl ketone, alkylene glycols and/or alkylene glycol alkyl ethers having from 3 to 20 carbon atoms, acetates and their derivatives, ethylene carbonate, etc. Illustrative U.S. patents of the carrier and/or solvent systems cized polyvinyl chloride substrate in a conventional manner without any intermediate tie coat. The coatings were cured by heating to approximately 240° F. (116° C.) for about one minute.

TABLE I

| Components | Sample 1 | Sample 2 | Sample 3 | Sample 4 | Sample 5 |
|---|---|---|---|---|---|
| n-propyl acetate | 8.3 | 8.3 | 8.3 | 8.3 | 8.5 |
| THF | 0.925 | 10.9 | 10.9 | 10.9 | 10.9 |
| Polyester having 2 wt. % of 1st oxetane (6 mol % THF) | 18.95 | 0 | 0 | 0 | 16.8 |
| Polyester having 4 wt. % of 1st oxetane(6 mol % THF) | 0 | 0 | 0 | 18.95 | 0 |
| Polyester having 2 wt. % $2^{nd}$ oxetane(26 mol % THF) | 0 | 18.95 | 0 | 0 | 0 |
| Polyester having 4 wt. % $2^{nd}$ oxetane(26 mol % THF) | 0 | 0 | 18.95 | 0 | 0 |
| Resimene 747 | 18.55 | 18.55 | 18.55 | 18.55 | 20.15 |
| PTSA | 3.3125 | 3.3125 | 3.3125 | 3.3125 | 3.6 |
| n-propyl acetate | 8.5 | 8.5 | 8.5 | 8.75 | 8.75 |
| THF | 10.9 | 10.9 | 10.9 | 11.0 | 11.0 |
| Polyester having 2 wt. % 1st oxetane(6 mol % THF) | 0 | 0 | 0 | 0 | 0 |
| Polyester having 4 wt. % 1st oxetane (6 mol % THF) | 0 | 0 | 16.8 | 14.6 | 0 |
| Polyester having 2 wt. % $2^{nd}$ oxetane(26 mol % THF) | 16.8 | 0 | 0 | 0 | 0 |
| Polyester having 4 wt. % $2^{nd}$ oxetane(26 mol % TFH) | 0 | 16.8 | 0 | 0 | 14.6 |
| Resimene 747 | 20.15 | 20.15 | 20.15 | 21.75 | 21.75 |
| PTSA | 3.6 | 3.6 | 3.6 | 3.9 | 3.9 |

The units in the table above are grams.

available include U.S. Pat. Nos. 4,603,074; 4,478,907; 4,888,381 and 5,374,691 hereby incorporated by reference for their teachings both of carriers and/or solvent systems and of polyesters and amino resins. While most acetate type solvents can be used, e.g. n-butyl acetate, a preferred solvent is n-propyl acetate. The amount of solvent(s) can desirably vary from about 20 parts by weight to about 400 parts by weight per 100 parts by weight of total polyester resin and amino resin.

The amount of catalyst is an amount that effectively catalyzes the mutual crosslinking of the polyester and amino resins under the crosslinking conditions chosen (usually elevated temperatures). As the crosslinking temperature increases above 150° F., 200° F., 250° F. or 400° F. (66° C., 93° C., 121° C. or 204° C.) the amount of catalyst can be reduced. Effective amounts of catalyst can vary from about 0.1, 0.5 or 1 to about 6 or 8 parts by weight and preferably from about 2 or 3 to about 6 parts by weight per 100 parts by weight total of said polyester and amino resins.

The poly(oxetane-THF-ester) of Example CP II was cured in a manner as follows.

EXAMPLE CP-IV

The four polyesters (2 or 4 wt. % oxetane and 6 or 26 mole percent of the polyoxetane being repeating units from THF of Example CP-II) were formulated into solvent based coating compositions as shown in Table 1. The Resimene 747 resin is an amino resin curative (alkylmelamine-formaldehyde) for polyester resins. The PTSA is paratoluene sulfonic acid catalyst (40 wt. % active in isopropanol). The coating compositions varied in the amount of polyoxetane in the polyester, the amount of tetrahydrofuran repeating units in the polyoxetane, and the weight ratio of Resimene to polyester. The coating compositions were applied to plasti- It should be noted that the technology shown in Table 1 results in high amounts of fluorine on the surface of the coating and the high amounts of fluorine are associated with low surface energy, good abrasion resistance, and easy cleaning. Good results were also obtained with respect to wetting, or flow, or leveling. Similar or identical recipes have resulted in 15–18 atomic percent fluorine on the surface as determined by XPS. This is generally a 30–50 percent increase over similar recipes using similar amounts of partially fluorinated polyoxetane but without pre-reaction of the polyoxetane into the polyester, e.g. the following control.

All example coatings CP-IV-2 through CP-IV-7 were prepared in the same fashion:

The components of the coating are allowed to mix for approximately two minutes. Typically, the coating is applied with a RDS 10 wire-bound rod to a white vinyl substrate. A majority of the solvent is removed quickly using a heat lamp (~150° F.). The coating is cured by heating to 250° F. for three minutes. Poly(3-FOX-ester) is (Poly-3-FOX modified polyester) as described above.

EXAMPLE CP-IV-2

Effect of Poly-3-FOX diol addition on wetting, flow and leveling on polyester/melamine coatings of various solids levels

| Sample | VR-248 Resin | Resimene 747 | PTSA | i-Propyl Acetate | Poly-3-FOX diol † | % Resin Solids |
|---|---|---|---|---|---|---|
| A | 5.00 | 1.72 | 0.16 | 4.74 | — | 45.0 |
| B | 5.00 | 1.72 | 0.16 | 3.44 | — | 50.0 |
| C | 5.00 | 1.72 | 0.16 | 1.48 | — | 60.0 |
| D | 5.00 | 1.72 | 0.16 | 0.09 | — | 70.0 |

Effect of Poly-3-FOX diol addition on wetting, flow and leveling on polyester/melamine coatings of various solids levels

| | | | | | | |
|---|---|---|---|---|---|---|
| E | 5.00 | 1.72 | 0.16 | 4.74 | 0.015 | 45.0 |
| F | 5.00 | 1.72 | 0.16 | 3.44 | 0.015 | 50.0 |
| G | 5.00 | 1.72 | 0.16 | 1.48 | 0.015 | 60.0 |
| H | 5.00 | 1.72 | 0.16 | 0.09 | 0.015 | 70.0 |

Composition given in grams.
† Average DP = 18.5; Rf = $CH_2CF_3$.

| Sample | Coating Appearance | 60° Gloss |
|---|---|---|
| A | Good | 66.9 ± 1.2 |
| B | Good coating but many bubbles in bulk of coating | 33.2 ± 2.5 |
| C | Complete dewetting of coating from substrate | — |
| D | Complete dewetting of coating from substrate | — |
| E | Good | 86.6 ± 1.7 |
| F | Good | 92.0 ± 0.6 |
| G | Good | 97.8 ± 0.8 |
| H | Good but small pinholes present on surface | 94.2 ± 1.4 |

Addition of Poly-3-FOX diol able to wet, flow and level at a variety of wt % solids.

EXAMPLE CP-IV-3

Effect of Poly-3-FOX diol additive amount on wetting, flow and leveling on polyester/melamine coatings at 70 wt % solids.

| Sample | VR-248 Resin | Resimene 747 | PTSA | n-Propyl acetate | Poly-3-Fox diol [a] |
|---|---|---|---|---|---|
| A | 2.83 | 3.34 | 0.19 | 0.20 | — |
| B | 2.83 | 3.34 | 0.19 | 0.20 | 0.0068 |
| C | 2.83 | 3.34 | 0.19 | 0.20 | 0.0229 |
| D | 2.83 | 3.34 | 0.19 | 0.20 | 0.0532 |

Composition given in grams.
[a] Average DP = 18; $R_f$ = $CH_2CF_3$.

| Sample | Coating appearance |
|---|---|
| A | Complete dewetting of coating from substrate |
| B | Good coating |
| C | Good coating |
| D | Good coating |

Even small levels of Poly-3-FOX diol provide for good wetting, flow and leveling.

EXAMPLE CP-IV-4

Effect of average degree of polymerization of Poly-3-FOX additives on wetting, flow and leveling of a polyester/melamine coating at 70 wt % solids.

| Sample | VR-248 Resin | Resimene 747 | PTSA | n-Propyl acetate | Poly-3-Fox diol |
|---|---|---|---|---|---|
| A | 2.83 | 3.34 | 0.19 | 0.20 | — |
| B | 2.83 | 3.34 | 0.19 | 0.20 | 0.0075 [a] |
| C | 2.83 | 3.34 | 0.19 | 0.20 | 0.0068 [b] |
| D | 2.83 | 3.34 | 0.19 | 0.20 | 0.0078 [c] |

Composition given in grams.
[a] Average DP = 6.7.
[b] Average DP = 18.
[c] Average DP = 23.

Effect of average degree of polymerization of Poly-3-FOX additives on wetting, flow and leveling of a polyester/melamine coating at 70 wt % solids.

| | | Gloss | |
|---|---|---|---|
| Sample | Coating appearance | 20° | 60° |
| A | Complete dewetting of coating from substrate | — | — |
| B | Complete dewetting of coating from substrate | — | — |
| C | Good coating | 47.3 ± 1.3 | 86.6 ± 14 |
| D | Good coating | 55.7 ± 3.9 | 97.3 ± 0.4 |

EXAMPLE CP-IV-5

Effect of $R_f$ length of PolyFOX additive on wetting, flow and leveling properties of polyester/melamine coating at 70 wt % solids.

| Sample | VR-248 Resin | Resimene 747 | PTSA | n-Propyl acetate | PolyFox diol |
|---|---|---|---|---|---|
| A | 2.83 | 3.34 | 0.19 | 0.20 | — |
| B | 2.83 | 3.34 | 0.19 | 0.20 | 0.015 [a] |
| C | 2.83 | 3.34 | 0.19 | 0.20 | 0.015 [b] |
| D | 2.83 | 3.34 | 0.19 | 0.20 | 0.016 [c] |

Composition given in grams.
[a] Poly-3-FOX; average DP = 35; $R_f$ = $CH_2CF_3$.
[b] Poly-5-FOX; average DP = 5.4; $R_f$ = $CH_2CF_2CF_3$.
[c] Poly-7-FOX; average DP = 9.8; $R_f$ = $CH_2CF_2CF_2CF_3$.

| Sample | Coating appearance | 60° Gloss |
|---|---|---|
| A | Complete dewetting of coating from substrate | — |
| B | Good coating | 102.2 ± 1.3 |
| C | Good coating | 101.4 ± 0.9 |
| D | Good coating | 100.9 ± 1.7 |

Short $R_f$ chain materials effective wetting, flow and leveling agents.

EXAMPLE CP-IV-6

Comparison of Poly-3-FOX diol additives and commercially available fluorosurfactant wetting, flow and leveling agents in polyester/melamine coatings at 70 wt %.

| Sample | VR-348 Resin | Resimene 747 | PTSA | n-Propyl acetate | Additive | Amount |
|---|---|---|---|---|---|---|
| A | 2.83 | 3.34 | 0.19 | 0.20 | — | — |
| B | 2.83 | 3.34 | 0.19 | 0.20 | Poly-3-Fox diol [a] | 0.015 |
| C | 2.83 | 3.34 | 0.19 | 0.20 | ZONYL FSO [b] | 0.015 |
| D | 2.83 | 3.34 | 0.19 | 0.20 | ZONYL FS-300 [c] | 0.015 |
| E | 2.83 | 3.37 | 0.19 | 0.20 | Fluoroad FC-430 [d] | 0.015 |

Composition given in grams.
[a] Average DP = 18, $R_f$ = $CH_2CF_3$.
[b] From DuPont; $F(CF_2)_{-8}CH_2CH_2O(CH_2CH_2O)_xH$.
[c] From DuPont; $F(CF_2)_{-8}CH_2CH_2O(CH_2CH_2O)_zH$.
[d] From 3M; Fluoroaliphatic polymeric esters.

-continued

Comparison of Poly-3-FOX diol additives and commercially available fluorosurfactant wetting, flow and leveling agents in polyester/melamine coatings at 70 wt %.

| Sample | Coating appearance | Gloss 20° | Gloss 60° |
|---|---|---|---|
| A | Complete dewetting of coating from substrate | — | — |
| B | Good coating | 69.4 ± 2.2 | 101.0 ± 1.1 |
| C | Complete dewetting of coating from substrate | — | — |
| D | Complete dewetting of coating from substrate | — | — |
| E | Partial dewetting of coating from substrate | — | — |

PolyFOX materials more effective wetting, flow and leveling agents in this particular system compared to commercially available fluorosurfactants sold as wetting, flow and leveling agents.

EXAMPLE CP-IV-7

Effect of Poly-3-FOX modified polyester on wetting, flow and leveling of a polyester/melamine coating at various solids levels

| Sample | Poly(3-FOX-ester) | VR-248 Resin | Resimene 747 | PTSA | n-Propyl acetate | Wt % Solids |
|---|---|---|---|---|---|---|
| A | | 2.83 | 3.34 | 0.19 | 0.20 | 70.0 |
| B | 2.83 | — | 3.34 | 0.19 | 6.41 | 40.0 |
| C | 2.83 | — | 3.34 | 0.19 | 0.20 | 70.0 |

Composition given in grams.

| Sample | Coating appearance |
|---|---|
| A | Complete dewetting of coating from substrate |
| B | Good coating |
| C | Good coating |

A PolyFOX modified polymer is effective also as an in-situ wetting, flow and leveling agent that is then made non-fugitive by crosslinking or reacting into the coating.

EXAMPLE CP-VI

Another example of a fluorinated polymer of the present invention is a fluorinated methacrylate. A specific example of such a polymer is trifluoroethyl methacrylate-butyl acrylate copolymer (75/25 mole %) obtained by free radical copolymerization of trifluoroethyl methacrylate (Aldrich Chemical Co.) and butyl acrylate (Aldrich Chemical Co.) in toluene at 60–65° C. using AIBN as initiator. This copolymer has a cyano polar group thereon, incorporated from an initiator fragment.

The various ingredients in Table II were allowed to mix for approximately two minutes. Typically, the coating is applied with a RDS 10 wire-bound rod to a white vinyl substrate. A majority of the solvent is removed quickly using a heat lamp (~150° F.). The coating is cured by heating to 250° F. for three minutes.

TABLE II

| Sample † | VR-248 Resin (g) | Resimene 747 (g) | p-Toluene Sulfonate (g) | n-Propyl Acetate (g) | TFEMA/BA Copolymer ‡ (g) |
|---|---|---|---|---|---|
| A | 2.83 | 3.34 | 0.19 | 0.20 | — |
| B | 2.83 | 3.34 | 0.19 | 0.20 | 0.0337 (0.1 wt %) |
| C | 2.83 | 3.34 | 0.19 | 0.20 | 0.0843 (0.25 wt %) |
| D | 2.83 | 3.34 | 0.19 | 0.20 | 0.1693 (0.50 wt %) |
| E | 2.83 | 3.34 | 0.19 | 0.20 | 0.3403 (1.0 wt %) |

† All formulations are 70 wt % solids.
‡ Trifluoroethyl methacrylate/butyl acrylate copolymer.
$M_n \approx 5{,}000$ g/mol.

TABLE III

| Sample | Coating Appearance |
|---|---|
| A | Complete dewetting |
| B | Partial dewetting; large amounts of orange peel |
| C | Partial dewetting; large amounts of orange peel |
| D | Partial dewetting; large amounts of orange peel |
| E | Good coating |

Generally, when a fluorinated polyacrylic is utilized, the amount thereof to achieve a suitable wetting, flow, or leveling effect is generally from about 0.05 wt % to about 5 wt % and desirably from about 0.75 wt % to about 3 wt % based upon the total weight of the fluorinated acrylate polymer or copolymer, the amino curing resin, and the polyester resin (Tables II and III).

Monohydroxylfuorooxetanes

Instead of an oxetane polymer having two hydroxyl end groups as in formulas 3A and 3B, a fluorine containing polymer having only one terminal hydroxyl group can be utilized. Such polymers are made by utilizing a mono alcohol initiator. A more detailed description of the preparation of the monofluorooxetanes is set forth in U.S. Ser. Nos. 09/473,518, filed Dec. 28, 1999 and 09/727,637, filed Dec. 1, 2000, which are hereby fully incorporated by reference.

Generally, any type of monoalcohol can be utilized to produce the monohydroxyl polyfluorooxetane (MOX) polymer, or copolymer composition of the present invention. Suitable monoalcohols generally include organic alcohols having from 1 to about 40 and preferably from about 1 to about 18 carbon atoms; polymeric alcohols; or tetrafluoroethylene based telomer alcohols. Examples of specific types of monohydric organic alcohols include the various aliphatic, aromatic, etc. alcohols such as alkyl alcohols, for example methyl alcohol, ethyl alcohol, propyl alcohol, etc., or the olefinic alcohols, for example allyl alcohol, etc. or the alicyclic alcohols, for example, cyclohexanol, etc. or the heterocyclic alcohols, for example furfuryl alcohol, etc. Various aromatic alcohols include benzyl alcohol, and the like. Moreover, halogenated organic alcohols and especially fluoroalcohols having from 2 to 18 carbon atoms are desired such as trifluoroethanol, heptafluorobutanol, heptadecylfluorooctanol, and the like. Especially preferred monohydric alcohols include benzyl alcohol, trifluoroethanol, heptafluorobutanol, pentafluoropropanol, pentafluorobutanol, nonafluorohexanol, various perfluoroalkylethanols, and allyl alcohol.

The polymeric alcohols are generally made from alkylene oxides having from 2 to 6 carbon atoms with 2 or 3 carbon atoms, that is ethylene oxide, propylene oxide, or tetrahydrofuran, or copolymers thereof being preferred. The number of repeat units of the polymeric alcohols can generally range from about 2 to about 50, desirably from about 3 to about 30 with from about 5 to 20 repeat units being preferred.

Another group of monoalcohols are the various tetrafluoroethylene based telomer fluoroalcohols such as those commercially available from Dupont as Zonyl, from Clarion as Fluowet, from Elf-Atochem as Foralkyl 6HN, and the like. Such fluoroalcohols have the general formula $CF_3CF_2(CF_2CF_2)_xCH_2CH_2OH$ where x is generally an integer of from 1 to about 19 and preferably from about 8 to about 12. While some of the fluoroalcohols are crystalline or solid at room temperature all are melted at temperatures of about 40° C.

While a monohydric alcohol can be utilized as an initiator in combination with a solvent, it is a preferred embodiment of the present invention to utilize a monohydric alcohol which serves as both an initiator as well as a solvent for the fluorooxetane monomers and the like. In other words, it is preferred that a solvent not be utilized other than a monoalcohol which can also function as a solvent in that it solubilizes the below noted oxetane monomers. Such co-initiator-solvent alcohols are desired inasmuch as they produce linear low molecular weight polyfluorooxetane oligomers, polymers, or copolymers and most preferably oligomeric dimers, trimers, and tetramers having low cyclic content. Such co-initiator-solvents include generally any of the above noted monoalcohols which solubilize the oxetane monomers with preferred alcohols including trifluoroethanol, benzyl alcohol, allyl alcohol, heptafluorbutanol, pentafluoropropanol, pentafluorobutanol, nonafluorohexanol, various perfluoroalkylethanols, and the like. The use of such co-initiator-solvent monoalcohols generally produces linear oligomers having less than about 10%, desirably less than about 8%, and preferably less than about 5%, or 3%, or 2%, or less than about 1% by weight of cyclic oligomers based upon the total weight of generally the oligomers, and also any polymers, or copolymers if the same are also produced. Similarly, if a polymer is produced, desirably the amount of cyclic oligomer produced is low, i.e. the same values as set forth immediately above, based upon the total weight of the polymers, and any oligomers, or copolymers produced. In the same manner, if copolymers are produced, the amount of cyclic oligomers is low based upon the total weight of the copolymer, and any oligomer or polymer which also may be inherently produced.

Although solvents are preferably not utilized in order to produce oligomers, polymers or copolymers having low cyclic oligomer content, it is to be understood that low amounts of non-initiator solvents might be utilized such as generally less than 25% or 15% and preferably less than 10%, 5%, 3% or nil by weight based upon the total weight of the small amount of non-initiator solvent utilized and the monoalcohol.

As noted above, the oxetane monomer used to form the polyfluorooxetane has the structure

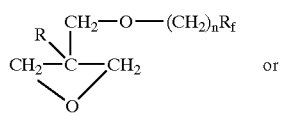

or

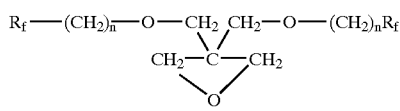

where R, $R_f$, and n are as set forth herein above.

The preparation of such fluorinated oxetane monomers was set forth herein above.

Generally any suitable cationic catalyst can be utilized to polymerize the fluorooxetane monomers such as various Lewis acids and complexes thereof. Examples of such Lewis acid catalysts include $Sn(IV)Cl_4$, antimony pentafluoride, phosphorous pentafluoride, and the like, with a complex of borontrifluoride and tetrahydrofuran being preferred.

According to a preferred embodiment of the present invention, a monoalcohol as hereinabove described is utilized as both an initiator and solvent, i.e., no solvent or a very small amount of a solvent such as dichloroethane is utilized. This preferred route will yield a polyfluorooxetane oligomer such as a homooligomer having an average DP of from about 2 to about 20, desirably from about 2 to about 10, and preferably from about 2 to about 4 with very little cyclic oligomer content as noted above. Such low molecular weight oligomers, e.g. dimers or trimers, are preferred inasmuch as when they are blended or reacted with a coating formulation, they tend to migrate faster to the surface of the blend or coating and give lower surface tensions and thus result in lower coefficient of friction as compared to polyfluorooxetanes having a higher average degree of polymerization. While not preferred, polyfluorooxetane polymers or of up to about 50, 100, or 150 can be utilized. Alternatively, but not preferably, copolymers can also be made.

While not preferred, the polymerization can be carried out in the presence of a Lewis acid catalyst and a Bronsted acid catalyst, as well as a non-initiator or solvent for the fluorooxetane monomer. Examples of suitable non-initiator or non-monoalcohol solvents include trifluorotoluene, dichloroethane, dimethylformamide, as well as dichloromethane. The amount of the alcohol initiator and catalyst for either the above preferred or non-preferred embodiment will generally vary inversely with the desired molecular weight of the polymer. That is, the polymerization is initiated by each alcohol and catalyst molecule generally on a quantitative basis for a given amount of fluorooxetane monomer, hence, the molecular weight of the polyfluorooxetane oligomer or polymer or copolymer will be determined by the amount of alcohol utilized. When this route is utilized, the average degree of polymerization (DP) is also from about 2 to about 20, desirably from about 2 to about 10, and preferably from about 2 to about 4, however, the degree of polymerization can also be up to 50, up to about 100, or even up to about 150.

The reaction rate for forming the polyfluorooxetane oligomer, polymer, or copolymer, utilizing a monoalcohol and a Lewis acid catalyst will vary with temperature. Accordingly, the reaction time is generally from 2 hours to 40 hours, and desirably is from about 4 to about 24 hours. The polymerization temperatures are generally from about 0° C. up to about 100° C., and desirably from about 18° C. to about 50° C. Lower reaction temperatures result in very slow reaction rates, whereas higher reaction temperatures will generally result in the formation of cyclic structures containing from 3 to 4 oxetane units. As noted, monomer conversion to polymer is essentially quantitative. The monohydroxyl polyfluorooxetane oligomers, polymers or copolymers produced are washed with water to obtain a neutral pH and the water removed as by decanting. Subsequently, any suitable desiccant can be utilized such as calcium chloride, phosphorus pentoxide, calcium carbonate, magnesium sulfate, molecular sieves, to dry the oligomers or polymers.

The monofunctional polyfluorooxetane oligomers or polymers generally have repeat units as set forth in formulas 3A and 3B above, and the polymer formula is as follows:

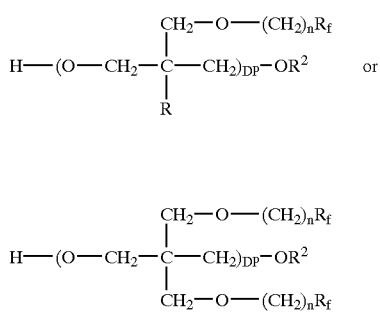

where n, R, $R_f$ and DP are described herein above and wherein $R^2$ is the organic group of the reactive monoalcohol. That is, $R^2$ is derived from an alcohol as noted above such as an organic alcohol having from 1 to about 40 and preferably from 1 to about 18 carbon atoms, or a polymeric alcohol, etc. If more than one type of monoalcohol is utilized to prepare the polyfluorooxetane oligomers or polymers, naturally the $R^1$ of one or more different polymers, copolymers, or oligomers will be different.

The fluorooxetane monomers, as noted above but not preferred, can be copolymerized with a variety of comonomers having epoxy (oxirane) functionality such as epichlorohydrin, propylene oxide, ethylene oxide, butyl glycidylether, and perfluorooctyl propylene oxide as well as alkyl substituted oxiranes having from 1 to about 20 or from about 7 to about 12 carbon atoms or mixtures thereof; monomers having a 4membered cyclic ether group such as trimethylene oxide, 3,3-bis (chloromethyl)oxetane, 3,3-bis (bromomethyl)oxetane, and, 3,3-bromomethyl(methyl) oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The copolymerization reaction is carried out generally under the same conditions as is the polymerization of the fluorooxetane monomers set forth hereinabove. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers.

Experimental

EXAMPLE MOX 1

Preparation of Monohydric Polyfluorooxetane using Benzyl Alcohol Initiator and Dichloromethane Solvent Only glass reactors and condensers were used in this procedure. All glassware and chemicals were dried prior to use. A 10 liter round bottomed flask equipped with a condenser, addition funnel, and rubber septum was charged with 1,763.4 grams of dichoromethane solvent. The catalyst, boron trifluoride-tetrahydrofuran (67.15 grams), and the initiator benzyl alcohol, 129.7 grams, (mono-functional alcohol) were added to the reaction flask. 3-FOX (3,314.7 grams) were added to an addition funnel. 3-FOX monomer can be made in a manner as set forth in U.S. Pat. Nos. 5,650,483; 5,668,250; 5,668,251; or 5,663,289. Approximately one-third of the mixture was added to the round-bottomed flask and allowed to stir for approximately 15 to 30 minutes until the reaction was initiated. The temperature was maintained at a temperature of about 20 to 23° C. The remaining monomer mixture was added dropwise over a four-hour period. The reaction mixture was allowed to stir four hours until the conversion reached 97 to 99.8 percent as measured by $H^1$-NMR. The reaction mixture was washed with water to a neutral pH, the water was decanted and the product was dried over magnesium sulfate. The remaining solvents were removed at reduced pressure. The weight of the cyclic oligomers formed based upon the total weight of the copolymer was approximately 15% by weight.

EXAMPLE MOX 2

Preparation of Monohydric Polyfluorooxetane using Trifluoroethanol Initiator and Dichloromethane Solvent Dichloromethane solvent (26.6 g) was introducted into a dry flask under a dry nitrogen purge. $BF_3$-THF (7.57 g) catalyst was then slowly syringed into the flask and the mixture stirred. While stirring, trifluoroethanol (initiator) (13.6 g) was slowly syringed into the reactor. The mixture temperature was then brought to 350° C. and allowed to react for approximately 30 minutes. Fifty grams (50 g) of 3-FOX monomer were then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition was complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase is again tested for pH and discarded.

This process was repeated until the pH of the aqueous phase was at least 5. The organic phase was then subjected to rotating evaporation until all the dichloromethane is gone as measured by NMR. Characterization by proton NMR spectroscopy showed the polyol to have an average degree of polymerization (DP) of 7.6 and a tetrahydrofuran (THF)

comonomer content of 14.3 mole %. The weight of the cyclic oligomers formed based upon the total weight of the copolymer was approximately 15% by weight.

EXAMPLE MOX 3

Preparation of Monohydric Polyfluorooxetane using Allyl Alcohol Initiator and Dichloromethane Solvent Dichloromethane solvent (26.6 g) was introduced into a dry flask under a dry nitrogen purge. $BF_3$-THF (2.53 g) was then slowly syringed into the flask and the mixture stirred. While stirring, allyl alcohol (initiator) (2.62 g) was slowly syringed into the reactor. The mixture temperature was then brought to 35° C. and allowed to react for approximately 30 minutes. Fifty grams (50 g) of 3-FOX monomers were then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition is complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase was again tested for pH and discarded. This process was repeated until the pH of the aqueous phase was at least 5. The organic phase was then subjected to rotating evaporation until all the dichloromethane was gone as measured by NMR. Characterization by proton NMR spectroscopy showed the polyol to have an average degree of polymerization (DP) of 8.3 and a tetrahydrofuran (THF) comonomer content of 4.5 mole %. The weight of the cyclic oligomers formed based upon the total weight of the copolymer was approximately 15% by weight.

Examples 4, 5, and 6 relate to the preparation of monohydric polyfluorooxetane copolymers using the same monoalcohol initiator as a co-initiator solvent and thus no non-monoalcohol solvent was utilized.

EXAMPLE MOX 4

Synthesizing Low MW 3-FOX Oligomer using Trifluoroethanol as Co-Initiator-Solvent

|  | FW | Moles | Mole Ratio | g | d g/mL | mL | g actual |
|---|---|---|---|---|---|---|---|
| 3-FOX | 184.15 | 0.272 | 5.01 | 50.00 | 1.15 | 43.48 | 58.38 |
| $CF_3CH_2OH$ | 100.04 | 0.136 | 2.5 | 13.6 | 1.373 | 9.91 | 9.91 |
| $BF_3THF$ | 139.91 | 0.054 | 1.0 | 7.6 | 1.268 | 5.99 | 7.6 |
| $CF_3CH_2OH$ (Schent) | 100.04 | 0.375 | 6.9 | 69.0 | 1.15 | 60 | 69 |

Apparent DP = 3.6 (FOX)
by end group analysis
Actually a mixture of linear dimer, trimer: tetramer
A small amount of cyclics
13.8 mole % THF, Theoretical = 14.6 mole %

Total $\frac{\text{3-FOX}\ (CF_3CH_2OH)}{\text{Monomer: initiator}} \rightarrow 1.61:1$ By using trifluoroethanol as the initiator and solvent, very low MW linear oligomers may be formed in high yields without the production of significant amounts of cyclic oligomer. That is, the amount of cyclic oligomer formed was less than 1% by weight based upon the total polyfluorooxetane formed.

With regard to the preparation of Examples MOX 4, 5 and 6, all glassware and reagents were dry prior to use. Water content of the reagents to be less than 500 ppm and confirmed by Karl Fisher analysis. The trifluoroethanol for initiation and BF3/THF were introduced into the dry flask under a dry nitrogen purge and allowed to stir for 30 mins. at room temperature. The reaction flask was then heated to 40° C. and the remaining trifluoroethanol and 3-FOX solution were pumped into the reactor using the pump rate to keep the temperature below 54° C. After the monomer addition was complete, the reaction temperature was maintained at 40° C. overnight. The polymer was isolated by diluting the mixture with solvent and washing it with 5% sodium bicarbonate solution and water until neutral. Dilution was to 1 g polymer to 1 mL of solvent. The makeup solvent was dichloromethane. The organic phase was then separated from the aqueous phase and subjected to rotating evaporation until all of the solvents had been removed. Characterization by proton NMR spectroscopy showed the polyol to have an average degree of polymerization (DP) of 3.6 by end group analysis.

EXAMPLE MOX 5

Synthesizing Low MW 3-FOX Oligomer using Trifluoroethanol as Co-Initiator-Solvents

| Substance | Ratio | MW | Eq | mmoles | d g/mL | mL | A Used |
|---|---|---|---|---|---|---|---|
| 3-FOX Monomer | 0.741 | 184.15 | 2.0 | 271.52 | 1.15 |  | 50.019 |

-continued

Synthesizing Low MW 3-FOX Oligomer using Trifluoroethanol as Co-Initiator-Solvents

| Substance | Ratio | MW | Eq | mmoles | d g/mL | mL | A Used |
|---|---|---|---|---|---|---|---|
| Trifluoro-ethanol, co-initiator solvent | | 100.04 | 5.07 | 689.72 | 1.185 | 58.2 | 69.011 |
| Trifluoro-ethanol, co-initiator solvent | 0.0232 | 100.04 | 1.00 | 136.00 | 1.00 | 13.6 | 13.611 |
| $BF_3THF$, catalyst | 0.0125 | 139.9 | 0.40 | 54.40 | 1.1 | 6.9 | 7.664 |

The oligomer was prepared and purified in a manner as set forth in Example 4. The average degree of polymerization was about 2 and the amount of cyclic oligomer was less than 1% by weight based upon the total weight of polyfluorooxetane.

EXAMPLE MOX 6

Synthesizing Low MW 5-FOX Oligomer using Trifluoroethanol as Co-Initiator-Solvents

| Substance | Ratio | MW | Eq | mmoles | d g/mL | mL | B Used |
|---|---|---|---|---|---|---|---|
| 5-FOX Monomer | 0.741 | 234.15 | 1.8 | 213.54 | 1.15 | | 50.030 |
| Trifluoro-ethanol, co-initiator solvent | | 100.04 | 5.96 | 689.72 | 1.185 | 58.2 | 69.360 |
| Trifluoro-ethanol, co-initiator solvent | 0.0232 | 100.04 | 1.00 | 115.77 | 1.00 | 11.6 | 11.625 |
| $BF_3THF$, catalyst | 0.0125 | 139.9 | 0.40 | 46.31 | 1.1 | 5.9 | 6.504 |

The oligomer was prepared and purified in a manner as set forth in Example 4. The average degree of polymerization was about 2 and the amount of cyclic oligomer was less than 1% by weight based upon the total weight of polyfluorooxetane. 5-FOX is (1,1,1,2,2-pentafluoropropanoxy)methyl oxetane.

As apparent from Examples MOX 4 through 6, the amount of cyclic oligomer formed, when utilizing a monoalcohol as both an initiator and a solvent without any other solvent, was negligible, generally less than 1% by weight, whereas when a different solvent was utilized as set forth in examples 1 through 3, the amount of cyclic oligomer was about 15% by weight.

Polar Group Terminated, Short Chain $R_f$ Containing Polymers

Any of the above described polymers such as the fluorinated oxirane, the fluorinated polyacrylate, the fluorinated FOX-lactone, can contain one or more polar groups thereon. The following examples relate to a polyoxetane having a polar group theron.

EXAMPLES A–D FUNCTIONALIZING POLY5FOX

Synthesizing Anion-cation Terminated Polyoxetanes

The poly diol (200.0 g, HEW 860.6, 0.2325 mole OH, 1.0 eq) and solvent (tetrahydrofuran) 200.0 g were introduced into a flask at 50 wt % solids and allowed to stir at 0° C. Fuming sulfuric acid (26.9 g, 0.2866 mole, 1.23 eq) was then dripped into flask at a rate to keep the temperature below 15° C. The reaction was followed by end group analysis which was performed by proton NMR and by an ammonium hydroxide titration to a bromothymol blue endpoint. Once the conversion exceeded 80–85%, the acid ends and excess acid were neutralized by 28 wt % aqueous ammonium hydroxide (31.6 g, 0.2524 mole, 1.1 eq) while maintaining a temperature below 20° C. The solution pH was followed by pH paper or pH meter to a pH of 7–8. The solution was allowed to stir at 0° C. for two hours to allow for complete salt formation. Salts were removed by vacuum filtration. The solution was then subjected to rotating evaporation until all of the solvent and water was removed.

EXAMPLES E–H FUNCTIONALIZING Poly3FOX

Synthesizing Anion-cation Terminated Polyoxetanes

The poly diol (3524.0 g, HEW 715.02, 4.93 mole OH, 1.0 eq) and solvent (tetrahydrofuran) 200.0 g were introduced into a flask at 50 wt % solids and allowed to stir at 0° C. Fuming sulfuric acid (854.73 g, 9.11 mole, 1.85 eq) was then dripped into flask at a rate to keep the temperature below 15° C. The reaction was followed by end group analysis which was performed by proton NMR and by an ammonium hydroxide titration to a bromothymol blue endpoint. Once the conversion exceeds 80%–85% the acid ends and excess acid was neutralized by 25.2 wt % aqueous ammonium hydroxide (708.23 g, 5.09 mole, 1.03 eq) while maintaining a temperature below 20° C. The solution pH was followed by pH paper or pH meter to a pH of 7–8. The solution was allowed to stir at 0° C. for two hours to allow for complete salt formation. Salts were removed by vacuum filtration. The solution was then subjected to rotating evaporation until all of the solvent and water was removed.

The above-noted polymers were then tested with regard to surface tension in a solution of water or a water-methanol mixture and the results are set forth in Table IV.

TABLE IV

| Sample | | Wt % Sample | Wt % Added Methanol | Surface Tension (mN/m) |
|---|---|---|---|---|
| A | $(Poly\text{-}5\text{-}FOX)_n(OSO_3)_2(NH_4^+)_2$ | 1 | 0 | 26.2 ± 0.2 |
| B | $(Poly\text{-}5\text{-}FOX)_n(OSO_3)_2(NH_4^+)_2$ | 0.1 | 0 | 26.1 ± 0.2 |
| C | $(Poly\text{-}5\text{-}FOX)_n(OSO_3)_2(NH_4^+)_2$ | 1 | 0.3 | 25.3 ± 0.1 |
| D | $(Poly\text{-}5\text{-}FOX)_n(OSO_3)_2(NH_4^+)_2$ | 0.1 | 0.03 | 26.3 ± 0.2 |
| E | $(Poly\text{-}3\text{-}FOX)_{n'}(OSO_3)_2(NH_4^+)_2$ | 1 | 0 | 28.7 ± 0.1 |
| F | $(Poly\text{-}3\text{-}FOX)_{n'}(OSO_3)_2(NH_4^+)_2$ | 0.1 | 0 | 29.2 ± 0.1 |
| G | $(Poly\text{-}3\text{-}FOX)_{n'}(OSO_3)_2(NH_4^+)_2$ | 1 | 0.3 | 27.3 ± 0.1 |
| H | $(Poly\text{-}3\text{-}FOX)_{n'}(OSO_3)_2(NH_4^+)_2$ | 0.1 | 0.03 | 29.1 ± 0.2 | n = 7.0, $M_w/M_n$ = 1.55–1.75.
n' = 7.2, $M_w/M_n$ = 1.44–1.65.

As apparent from Table IV, the low $R_f$ carbon atom polyoxetanes containing polar end groups had good surface tension values in water. According to the present invention, at a 0.1% by weight concentration in water of the low carbon atom fluorinated $R_f$-polar polyoxetanes, surface tension values can range from about 25 to about 45 or 70, and preferably from about 25 to about 30 or 35 millinewtons/meter.

EXAMPLE J

The following is a preparation of a polyoxetane copolymer utilizing a tosyl group to add an amphoteric polar end group thereto.

Preparation of 3-Methyl-3-Oxetanemethanol

Trimethylolethane was used as receive from GEO Specialty Chemicals, Trimet Products Group, 2409 N. Cedar Crest Blvd, Allentown, Pa. 18104-9733. Diethyl carbonate was used as received from Bayer Industrial Products Division, 100 Bayer Road, Pittsburgh, Pa. Dimethyl carbonate was used as received from SNPE North America, N.J. p-Toluenesulfonyl chloride was used as received from Biddle Sawyer Corporation. Potassium hydroxide and ethanol were used as received.

Into a 250 mL round bottomed flask fitted with a magnetic stirrer, thermometer, condenser, distillation head, and receiver were placed 240.30 g trimethylol ethane (2.0 mol), 180.16 g dimethyl carbonate (2.0 mol), and 0.20 g potassium hydroxide dissolved in 8 mL methanol. The mixture was refluxed until the pot temperature fell below 70° C., and then the methanol was removed by distillation while keeping the head temperature at 64° C.–66° C. (136.22 g isolated). Distillation was continued until the pot temperature rose to 145° C. The pressure was gradually reduced to 27 in Hg while maintaining a pot temperature of 140° C.–150° C. Rapid distillation of the product began, and 101.5 g of 3-methyl-3-oxetanemethanol distilled at 115° C.–120° C. (~49%).

Requirements: Reactor equipped with a reflux condenser and short path distillation setup. Requires a sophisticated short path setup with ability to fractionate the oxetane from the cyclic carbonate formed in the condensation process (with pot and head temperature readouts!).

Preparation of 3-Methyl-3-Tosylmethyloxetane 3-methyl-3-oxetanemethanol (100 g, 0.98 mol) was dissolved in 250 mL methylene chloride, and a 35% solution of sodium hydroxide (143.60 g, 1.08 mol) was added, and the reaction was cooled to 0° C. A solution of p-toluenesulfonyl chloride was added (186.67 g, 0.98 mol) in 375 mL methylene chloride was added over 1 hour. A white precipitate formed immediately. The reaction was stirred for 10 additional hours. 1000 mL of water was added. The dichloromethane solution layer was then removed, and dried with sodium sulfate, and the solvent was removed.

Yield: 217.77 grams of 3-methyl-3-tosylmethyloxetane as white crystals, 87%. From: Col. Czech. Chem. Commun. V52, p. 2057

To a 250 mL 3-necked round bottomed flask was added neopentyl glycol (6.25 grams, 0.06 moles), 29 mL methylene chloride, and $BF_3THF$ (3.36 g, 0.02 moles). 3-FOX monomer (50 g, 0.27 moles), and 3-p-toluenesulfonylmethyl-3-methyloxetane (23.05 g 0.09 mol) were added dropwise over 40 minutes. After two hours, proton-NMR analysis indicated polymerization of the oxetane monomer was complete with a degree of polymerization of 6. 80 grams of methylene chloride was then added, and the polymer solution was washed with water until a neutral pH was obtained. Final yield was 57.98 grams, the oxetane degree of polymerization was 6, and the hydroxyl equivalent weight was 608.8.

Sulfate Functionalization of poly-3-FOX-co-3-tosylmethyl-3-methyl oxetane with Fuming Sulfuric Acid and Amphoteric Polymer Preparation The copolymer was reacted in the following manner to form an amphoteric end group with the nonFOX polymer containing an $-NH_3^+$ group therein.

1. Dissolve 50 grams of difunctional poly-3-FOX-co-3-p-toluenesulfonylmethyl oxetane dp 6 (hydroxyl equivalent weight=608.8 grams per mol OH, 0.08 Mol OH) in 50 g tetrahydrofuran (50% solids). Cool the solution to 0° C.
2. Add 18.34 grams of 20% fuming sulfuric acid (average MW=93.58, 0.20 Mol acid, 2.38 equivalents). Do not allow exotherm to exceed 15° C. Upon completion of addition, allow exotherm to subside to a temperature of 6–8° C., then stir for 1 hour at 25° C.
3. Continue heating until a conversion of 85%+ is obtained.
4. Neutralize the acid with concentrated aqueous ammonia, maintaining a solution temperature below 20° C., (13.78 g, 0.23 mol ammonia). Follow the solution pH with pH paper or a pH meter, and add additional ammonia as necessary until a solution pH of 7–8 is obtained, again do not allow exotherm to exceed 20° C.
5. After two hours at 0° C., vacuum filter to remove salts.
6. Remove the THF/water solvent from the product under reduced pressure.

The various noted fluorinated polar polymers of the present invention unexpectedly functioned as wetting agents, or flow agents, or as leveling agents in a variety of aqueous and non-aqueous coatings. Examples of aqueous coatings include latex paints and floor polishes that are

| PREPARATION OF POLY-3-FOX-CO-3-TOSYLMETHYL-3-METHYL OXETANE | | | | | | | |
|---|---|---|---|---|---|---|---|
| Compound | Scale | Ratio | MW | Moles | Mole Ratio | d (g/mL) | mL |
| 3-FOX | 50.0 | 1.0 | 184.15 | 0.27 | 11.31 | 1.150 | 43.5 |
| 3-p-toluensufonyl-3-methyloxetane | | 0.5 | 256.08 | 0.09 | 3.75 | 1.200 | |
| Methylene Chloride | | 0.53 | 84.93 | 0.46 | 18.99 | 1.330 | 29.1 |
| Neopentyl Glycol | | 0.12498 | 104.15 | 0.06 | 2.50 | 1.017 | 6.1 |
| $BF_3THF$ | | 0.06715 | 139.90 | 0.02 | 1.00 | 1.268 | 2.6 |
| Methylene Chloride | | 0.8 | 84.93 | 0.47 | 19.62 | 1.330 | 30.1 |
| 7.5% sodium bicarbonate | | 0.8 | 84.01 | 0.04 | 1.49 | 1.000 | 40.0 |
| Water | | 0.85 | 18.01 | 2.36 | 98.33 | 1.000 | 42.5 |
| Theoretical Yield (g) | 57.98 | | | | | | |
| Expected Yield, Low (g) | 52.18 | | | | | | |
| Expected Yield, High (g) | 55.08 | | | | | | |
| Solids Loading reaction, % | 69.22 | | | | | | |
| solids Loading wash, % | 47.27 | | | | | | |
| | mL | | | | | | |
| Initial Volume | 72.20 | | | | | | |
| Volume after quench, mL | 142.27 | | | | | | |
| Volume after wash, mL | 144.77 | | | | | | | applied to glass, wood, metal, ceramic and polymeric substrates. Examples of non-aqueous or solvent-based coatings include enamels and varnishes that are applied typically to the same aforementioned substrates. Furthermore, the various noted fluorinated, polar polymers are effective as wetting, flow or leveling agents in variety of powder and radiation-curable coatings The noted fluorinated polar polymers function by lowering the surface tension of the coating below that of the substrate onto which they are applied.

The various fluorinated polar polymers also can be utilized as an additive for various consumer products, for example cleaners, shampoos, cosmetics, etc., and also as cleaners for furniture, glass, car polish, and the like.

Moreover, fluorinated polar polymers of the present invention can be utilized in coatings on various substrates to form a laminate.

A desired end use for the fluorinate containing polymers of the present invention is used as an additive in a floor polish composition or formulation.

Floor polish formulations are aqueous emulsions and comprised typically of polyolefin wax emulsions, alkali soluble resins typically of the styrene-acrylic copolymer type, short chain acrylic polymers or copolymers, plasticizers, biocides, water, variety of coalescing solvents typically of the glycol ether type and defoamers typically of the silicone surfactant type. Floor polish formulations are typically in the pH range of 8–10. A wetting, flow, or leveling agent, typically of a fluorosurfactant type, is added to impart a high gloss finish to the dried coating.

Floor Polish Composition Preparation (Bench Scale)

Floor polish samples for bench scale testing were mixed in 100 g quantities in glass jars with 120 g capacity. A magnetic stir bar is placed into the glass jar and the jar is placed on a balance. De-ionized water is added in a range of 30–50 g. A permanent plasticizer is added in a range of 1 g–4 g. Tributoxy ethyl phosphate is a common plasticizer used in floor finish. A glycol ether or mixture of glycol ethers are added in a range of 1 g–7 g. The sample is then placed on a stir plate and allowed to stir for 15 minutes. The jar is then placed on to a balance. Styrene-Acrylic copolymer or similar polymer blends are added in a range of 20 g–50 g. The sample is then returned to the stir plate and allowed to mix for 30 minutes. The mixture is placed on to a balance. Polyethylene and/or polypropylene wax emulsions, alkali soluble resins, short chain acrylic copolymers, and/or blends of these substances are added in a range of 0 g–15 g. At this time 150 ppm active Polymer 6A or Polymer 6B are added to the mixture. The mixture is allowed to stir for at least 2 hours. The sample is then allowed to equilibrate for 24 hours at room temperature.

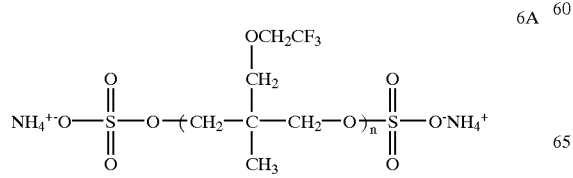

6A

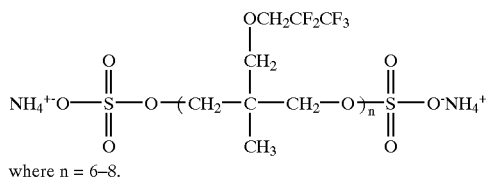

6B where n = 6–8.

Floor Polish Composition Preparation (Commercial Scale)

Commercial scale production of floor polish containing the following composition is accomplished typically in 3000 gallon batches. 11,017 lbs of deionized water is added to a 3,000 gallon vessel. A plasticizer, such as tributoxyethyl phosphate, is added at 750 lbs along with a coalescing solvent, such as diethylene glycol monoethyl ether, at 750 lbs, a bacteriostat, such as Proxel GXL (from Imperial Chemical Industries) at 25 lbs, and an antifoam, such as SAG 1010 (from Union Carbide Corp.) at 5 lbs. This mixture is allowed to stir for several hours at room temperature. At this time, the polymeric ingredients are added to the vessel. Typically, this would consist of the addition of 11,250 lbs of a styrene-acrylic copolymer and 1250 lbs of a polyethylene emulsion. The wetting, flow, or leveling agent of Polymer 6A or 6B is then added (12.5 lbs @ 30 wt % active ingredient). The final mixture is allowed to stir for several hours and then allowed to equilibrate for 24 hours at room temperature. A description of preparation of the compounds of the present invention on a commercial scale is now set forth with regard to a Poly-3-FOX polymer containing polar end groups of ammonium sulfate.

Commercial Scale Manufacture of Poly-3-FOX Polymer and Diammonium Disulfate

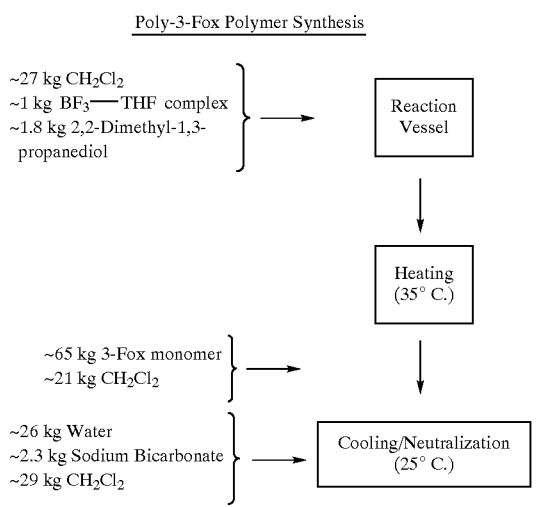

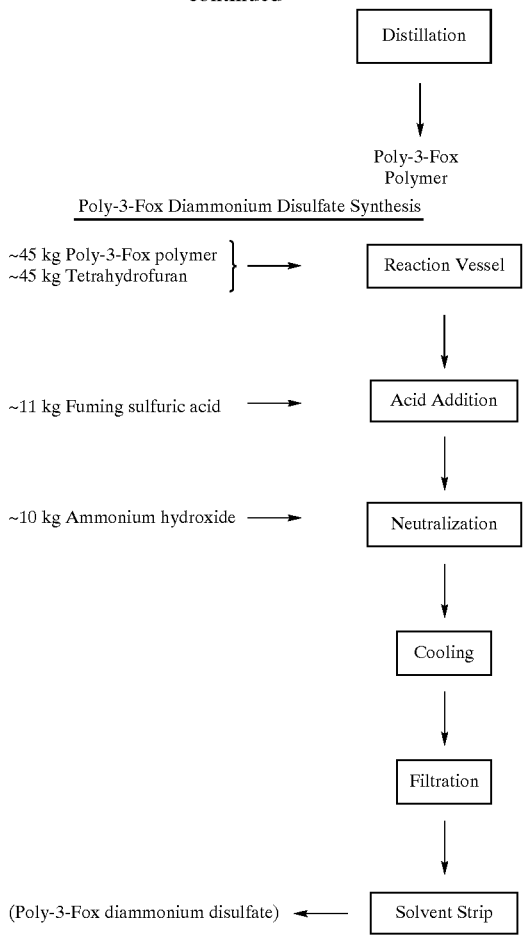

EXAMPLE

Laboratory Testing of Floor Polish

Laboratory testing of floor finish applications were preformed using the above described bench scale composition in accordance with ASTM D-1436. The polish is applied to a gauze pad with an automated pipette for a coverage rate equivalent to 2000 sq. feet/gallon of floor finish. In addition to room temperature, the floor finish is applied under different temperatures and humidities. The finish is applied at a humidity range of 20% RH to 80% RH. The finish is applied at temperature ranges of 55° F.–95° F. The finish is then reapplied with four additional coats. After drying, the finish is observed to be free of surface defects and dries to a high gloss. Very little or no foam was observed when the composition of polymers 6A and 6B were tested.

Following ASTM D-2047, floor finish made with Polymers 6A and 6B do not have a significant difference with respect to static coefficient of friction to a 95% confidence interval.

The application of a coating or paint or in this specific example, floor polish requires a shearing action. This shearing action can introduce foam to the coating, paint or polish. If the foam is persistent, (i. e., does not dissipate before the coating dries) undesirable optical effects are seen such as a very rough surface that reduces the desired high gloss imparted by the coating. In addition to fluorosurfactants, other surface active agents, such as sodium lauryl sulfate, are often introduced, for example, to stabilize the polymer emulsion comprising the coating. Due to inherent properties of many surface active agents added to the coating (such as very low surface tension and/or interfacial rheology), persistent foams are often produced. To circumvent this problem, defoamers are added to the composition. However, the fluorinated polymers such as Polymers 6A or 6B and those described in the present embodiment, produce little or no foam under shear with persistence times less than the drying time of the coating. In other words, the compositions are foaming resistant in that they have low or nil foam, any foam is of short duration, and the foam breaks or collapses before any film, layer, coating, etc. dries.

EXAMPLE

Field Sample Preparation and Testing of Floor Polish

Field samples are prepared in a plastic 2 or 5 gallon container depending on batch size. The bucket is placed on a bench scale +/−<1%. The bucket and mixer are placed under a small horse power electric lab mixer. Deionized water is added in a range of 30%–50%. The mixer is turned on low speed. The remaining chemicals are added in the same percentages and ranges of aforementioned bench samples. Mixing times are the same as with smaller samples. Items that are not easily measured within the tolerance of the scale are weighed on a bench top balance and added to the mixture.

An area is stripped using common industrial floor finish stripper diluted 4:1, agitated with a 3M black floor pad, and a low speed machine (175 RPM). The floor is rinsed twice with a cotton mop and allowed to dry. The bench polish composition described above is poured into a lined mop bucket. The polish is applied with a synthetic fiber string mop provided to us under the trade name Great White which is a registered trademark of the ETC of the Henderson Company. The mops used have been previously soaked in water overnight and wrung thoroughly before attaching to a mop handle and placed into the floor finish in the bucket. The mop is wrung until it is just dripping. The finish is applied to the floor covering a section with a continuous coat. Sections are coated sequentially until the entire area is coated. Once the finish is completely dry, additional coats are applied until a desired gloss is obtained.

It is important to note that the aforementioned examples of floor polish formulations containing the embodiment of this patent did not contain the silicone surfactant defoamer found typically in most floor polish formulations.

Powder Coatings

The various flow or leveling agents, are wetting agents of the present invention, that is the low carbon atom fluorinated $R_f$ group of a polyoxetane polymer or the other polymers as noted herein having either a hydroxyl end group or another polar end group as noted herein above, for example ammonium sulfate, can be formed into powder coating compositions. The advantage of a powder coating composition is that it is dry and can be used in various applications without the need to evaporate solvents which are undesirable or to even evaporate water. Such powder coating compositions generally contain resin, such as a polyester, an epoxy, and the like, a crosslinker, pigments, extenders, flow aids, specific processing aids and/or a degassing compound. Components are mixed by high speed blending and then melt mixed by extrusion. The extrudate is ground to reduce particle size and then classified according to size. Powder coatings based on thermoforming resins do not use a crosslinker. The composition of powder coatings are known to the literature and to the art.

The powder coating composition of Table V were made in the following manner.

EXAMPLE PC

Primid XL 552, a hydroxyl alkyl amide curative for acid functional polyester resins, is gaining wide acceptance as a replacement for triglycidylisocyanurate (TGIC), especially in Europe. Primid XL 552 cures by an esterification reaction with the elimination of water. It is a low molecular weight material with a crystalline structure. This makes it difficult to dispers in amorphous resins having a much higher melt viscosity, Whether because of the water generated during curing or the lack of complete mixing/dispersion in the resin matrix, Primid XL 552 cured powders are characterized by surface defects, described variously as micro pinholes or micro craters, resulting in a surface "haze", resulting in a low gloss finish and reduction in distinctness of image (DOI). The addition of the claims of this invention result in the production of powder coatings with much more desirable optical properties.

A series of eight powder coatings were prepared using conventional techniques: weighing/mixing, extrusion, grinding and classifying. Powders were extruded on a 50 mm twin screw extruder under the following conditions: rear zone heat @ 100° F.; front zone heat @ 150° F., screw speed=400 rpm; torque=70–80%. After compounding, powders were sifted through a 140 mesh (105 micron) screen and electrostatically sprayed on test panels. A 4×12 inch standard Q-Panel™ (0.032 inch, ground one side stainless steel primed substrate) was coated with each powder, spraying thin at the top and thicker at the bottom so the effect of thickness on appearance could be more readily discerned. All coatings were cured for 10 minutes at 400° F. Gloss (using a BYK Micro-Gloss meter), surface roughness ($R_a$) and plate flow (recommended Procedure Number 7 for Inclined Plate Flow published by the Powder Coating Institute) were measured on the final, cured coatings.

The ingredients of the compositions are as set forth in Table V.

TABLE V (composition values are parts per hundred of resin)

| Panel | 1 | 2 | 3 | 4 | 5 | 6 | 7 | 8 |
|---|---|---|---|---|---|---|---|---|
| Crylcoat ™ 7617[a] | 95 | 95 | 95 | 95 | 95 | 95 | 95 | 95 |
| Primid ™ XL 552[b] | 5 | 5 | 5 | 5 | 5 | 5 | 5 | 5 |
| Resiflow ™ P-67[c,d] | 1.2 | 1.2 | 1.2 | 1.2 | 1.2 | 1.2 | 1.2 | — |
| $TiO_2$ | 50 | 50 | 50 | 50 | 50 | 50 | 50 | 50 |
| Benzoin | 0.6 | — | — | 0.6 | 0.6 | 0.6 | 0.6 | 0.6 |
| Fluorinated Polymer[e,f] | — | 0.2 | 0.4 | 0.2 | 0.4 | — | — | 0.4 |
| FC-430[e,g] | — | — | — | — | — | 0.4 | — | — |
| FC-171[e,g] | — | — | — | — | — | — | 0.4 | — |
| Plate flow (mm) | 94 | 87 | 88 | 96 | 87 | 85 | 90 | 82 |
| Gloss (20°) | 75.7 | 80 | 82 | 86.8 | 87.8 | 86 | 87.2 | 84.5 |
| Gloss (60°) | 92.8 | 93.8 | 94.5 | 94.5 | 94.5 | 94 | 94.5 | 93.8 |
| $R_a$ (μm) | 0.24 | 0.12 | 0.18 | 0.12 | 0.12 | 0.18 | 0.22 | 0.19 |

[a] A hydroxyalkylamide crosslinker from UCB Chemicals Corporation.
[b] An acid functional polyester resin from DSM.
[c] 67 wt % active on silica carrier
[d] A modified polyacrylate flow control agent from Estron Chemicals, Inc.
[e] 50 wt% active on silica carrier.
[f] Fluorinated polymer (Formula 7).
[g] Fluorosurfactants from 3M.
FC-430 is a fluoroaliphatic polymeric, nonionic ester.
FC-171 is a perfluoroalkylsulfonate ethoxylated of the formula $F(CF_2)_8SO_2N(C_2H_5)(CH_2CH_2O)_{-8}CH_3$.
Formula 7

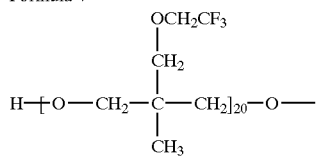

As apparent from Table V, the hydroxyl terminated flow and wetting agent of the present invention when added to the above noted powdered coating composition resulted in an improved gloss, see Examples 2 through 5, in comparison with the Control, Example 1. Moreover, the powder coatings of present invention generally achieve gloss values comparable to that of commercially available fluorsurfactants from 3M, i.e. Examples 6 and 7.

While in accordance with the patent statutes, the best mode and preferred embodiment have been set forth, the scope of the invention is not limited thereto, but rather by the scope of the attached claims.

What is claimed is:

1. A composition comprising:
   a polymeric material having at least one polar group and having at least one pendant group comprising an $R_f$ group, said polymeric material having at least 2 repeat units,
   wherein each said at least one polar group, independently, is an anion-countercation; or a cation-counteranion; or an amphoteric group;

wherein each said $R_f$ group, independently, is a fluorinated linear alkyl having from 1 to about 7 carbon atoms, or a fluorinated branched alkyl wherein the longest chain is from 1 to about 7 carbon atoms and each branch, independently, contains from 1 to about 3 carbon atoms, and each $R_f$, whether linear or branched, has at least one carbon atom bonded to at least one fluorine atom, and wherein each $R_f$ group, independently, has at least 25% of the non-carbon atoms being fluorine atoms and the remaining non-carbon atoms being H, I, Cl, or Br, and wherein said polymer is derived from:
a cyclic ether monomer having at total of from 2 to 5 carbon atoms in the ring with a total of 1 to 20 substituted carbon atoms, or dioxane, or dioxalane, or trioxane.

2. A composition according to claim 1, wherein at least 50% of the non-carbon atoms in said $R_f$ group are fluorine atoms, and wherein the number of repeat units of said polymer is from about 2 to about 100.

3. A composition according to claim 2, wherein at least 75% of the non-carbon atoms in said $R_f$ group are fluorine atoms.

4. A composition according to claim 3, wherein said $R_f$ group is a linear alkyl group having from 1 to 6 carbon atoms, or a branched alkyl group having a longest chain of from 1 to 6 carbon atoms and each branch chain independently having from 1 to about 2 carbon atoms.

5. A composition according to claim 4, wherein at least 90% of the non-carbon atoms in said $R_f$ group are fluorine atoms, wherein said polymer has from about 2 to about 20 repeat units, and wherein said anion is —$CO_2^-$ (Carboxylate), —$SO_3^-$ (Sulfonate), —$OSO_3^-$ (Sulfate), —$OPO_3^-$ (Phosphate), or —$ONO_2^-$ (Nitrate), wherein said countercation is $Li^+$ (lithium), $Na^+$ (sodium), $K^+$ (potassium), $Cs^+$ (cesium) or $NH_{4-x}R_x^+$ (quaternary ammonium) where x=4, or $NH_{4-x}R_x^+$ (ammonium) where x=0 to 3, wherein said cation is $NH_{4-x}R_x^+$ (quaternary ammonium) where x=4, or $NH_{4-x}R_x^+$ (ammonium) where x=0 to 3, or $PH_{4-x}R_x^+$ (Phosphonium), and wherein said counteranion is $F^-$ (fluoride), $Cl^-$ (chloride), $Br^-$ (bromide), $I^-$ (iodide), $I_3^-$, or $BF_4^-$ (tetrafluoroborate), and wherein said amphoteric is a covalent bonded cationic amine group and an anionic surfactant, and wherein said R is a hydrocarbyl having from 1 to about 10 carbon atoms.

6. A composition according to claim 5, wherein $R_f$ is a linear alkyl having from about 2 to about 4 carbon atoms or a branch alkyl having a longest chain of from 2 to about 4 carbon atoms with said branch chains independently, having from 1 to about 2 carbon atoms, and wherein said polymer is derived from an oxetane monomer having said at least one Rf group and optionally from a tetrahydrofuran comonomer.

7. A composition according to claim 6, wherein said polar group is covalently bonded to at least one end of said polymer, and wherein at least 95% of the non-carbon atoms in said $R_f$ group are fluorine atoms.

8. A composition according to claim 7, wherein said polymer has 1 or 2 polar end groups.

9. A wetting agent, or a flow agent, or a leveling agent, comprising; the composition of claim 1.

10. A wetting agent, or a flow agent, or a leveling agent, comprising; the composition of claim 2.

11. A wetting agent, or a flow agent, or a leveling agent, comprising; the composition of claim 4.

12. A wetting agent, or a flow agent, or a leveling agent, comprising; the composition of claim 5.

13. A wetting agent, or a flow agent, or a leveling agent, comprising; the composition of claim 7.

14. A wetting agent, or a flow agent, or a leveling agent, comprising; the composition of claim 8.

15. A surface active material comprising the composition of claim 1.

16. A surface active material comprising the composition of claim 3.

17. A surface active material comprising the composition of claim 5.

18. A surface active material comprising the composition of claim 7.

19. A surface active material that is foaming resistant comprising the composition of claim 8.

20. A floor polish comprising the composition of claim 1.

21. A floor polish comprising the composition of claim 3.

22. A floor polish comprising the composition of claim 5, and wherein said floor polish is an aqueous emulsion.

23. A floor polish comprising the composition of claim 7, and wherein said floor polish comprises a polyolefin wax emulsion.

24. A floor polish comprising the composition of claim 8, and wherein said composition has a pH of from about 8 to about 10.

25. A fluorine containing polymer, comprising:
a polyoxetane having from 2 to about 100 repeat units, DP, derived from an oxetane monomer, said polyoxetane having at least one pendant group comprising an $R_f$ group, wherein each $R_f$, independently, is a fluorinated linear alkyl having from 1 to about 7 carbon atoms or a fluorinated branched alkyl wherein the longest chain is an alkyl having from 1 to about 7 carbon atoms and each branched chain, independently, having from 1 to about 3 carbon atoms, and each $R_f$, whether linear or branched, has at least one carbon atom bonded to at least one fluorine atom, and wherein each said $R_f$, independently, has at least 25% of the non-carbon atoms of said alkyl being fluorine atoms and the remaining non-carbon atoms being H, I, Cl, or Br; optionally said polyoxetane being copolymerized with at least one comonomer; and said polyoxetane having at least one polar group covalently bonded thereto, and wherein each said at least one polar group, independently, is an anion-countercation; or a cation-counteranion; or an amphoteric group.

26. A fluorine containing polymer according to claim 25, wherein at least 50% of said oxetane repeat units contain said pendant $R_f$ group.

27. A fluorine containing polymer according to claim 26, wherein at least 75% of the non-carbon atoms of said $R_f$ alkyl group are fluorine atoms.

28. A fluorine containing polymer according to claim 27, wherein said pendant group comprises —$CH_2$—O—$(CH_2)_n$—$R_f$ where n is from 1 to about 6, wherein said $R_f$ is a linear alkyl having from 1 to 6 carbon atoms or a branched alkyl having a longest chain of from about 1 to about 6 carbon atoms and each branched chain, independently, has from about 1 to about 2 carbon atoms, and wherein said optional comonomer is tetrahydrofuran.

29. A fluorine containing polymer according to claim 28, wherein at least 80% of the non-carbon atoms of said $R_f$ group are fluorine atoms, and wherein said polyoxetane has a total of from 1 to about 10 polar groups.

30. A fluorine containing polymer according to claim 29, wherein said anion is —$CO_2^-$ (Carboxylate), —$SO_3^-$ (Sulfonate), —OSO$_3^-$ (Sulfate), —OPO$_3^-$ (Phosphate), or —ONO$_2^-$ (Nitrate), wherein said countercation is Li$^+$ (lithium), Na$^+$ (sodium), K$^+$ (potassium), Cs$^+$ (cesium) or NH$_{4-x}$R$_x^+$ (quaternary ammonium) where x=4, or NH$_{4-x}$R$_x^+$ (ammonium) where x=0 to 3;

wherein said cation is NH$_{4-x}$R$_x^+$ (quaternary ammonium) where x=4, or NH$_{4-x}$R$_x^{30}$ (ammonium) where x=0 to 3, or PH$_{4-x}$R$_x^+$ (Phosphonium), and wherein said counteranion is F$^-$ (fluoride), Cl$^-$ (chloride), Br$^-$ (bromide), I$^-$ (iodide), I$_3^-$, or BF$_4^-$ (tetrafluoroborate), and wherein said amphoteric is a covalent bonded cationic amine group and an anionic surfactant, and wherein said R is a hydrocarbyl having from 1 to about 10 carbon atoms.

31. A fluorine containing polymer according to claim 30, wherein said polyoxetane has from 2 to about 10 repeat groups, and wherein said R$_f$ is a linear alkyl containing from 2 to about 4 carbon atoms or a branched alkyl having a longest chain of from about 2 to about 4 carbon atoms with each branched chain containing from about 1 to about 2 carbon atoms.

32. A fluorine containing polymer according to claim 31, wherein substantially each said oxetane repeat unit contains said pendant group, and wherein said polyoxetane contains two said polar groups and said polar groups are located on the ends of said polymer.

33. A fluorine containing polymer according to claim 28, wherein said polyoxetane has the formula

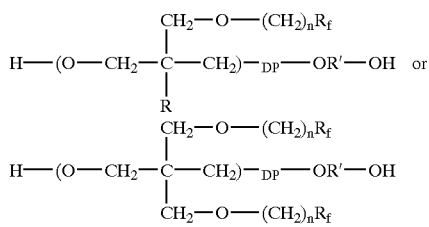

wherein said DP is from about 2 to about 50, wherein R' is an alkyl having from 1 to about 18 carbon atoms, and wherein R is an alkyl having from 1 to 6 carbon atoms, or

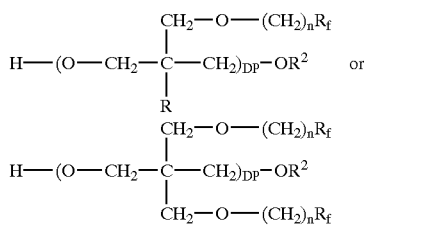

wherein said DP is from 2 to about 50, wherein R is an alkyl having from 1 to 6 carbon atoms, and wherein R$^2$ is derived from an organic alcohol having from 1 to about 40 carbon atoms, and including said tetrahydrofuran.

34. A fluorine containing polymer according to claim 32, wherein said polyoxetane has the formula

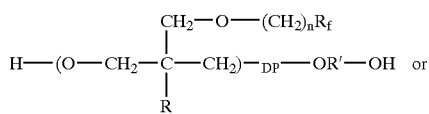

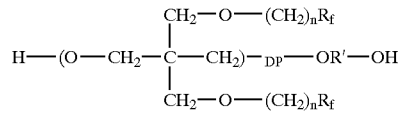

wherein said DP is from about 2 to about 50, wherein R' is an alkyl having from 1 to about 18 carbon atoms, and wherein R is an alkyl having from 1 to 6 carbon atoms, or

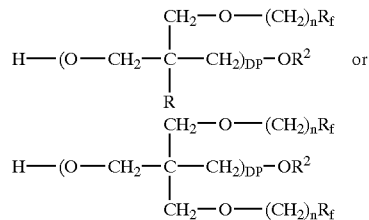

wherein said DP is from about 2 to about 20, wherein R is an alkyl having from 1 to 6 carbon atoms, and wherein R$^2$ is derived from an organic alcohol having from 1 to about 40 carbon atoms, and including said tetrahydrofuran comonomer.

35. A wetting agent, or a flow agent, or a leveling agent, comprising the composition of claim 25.

36. A wetting agent, or a flow agent, or a leveling agent, comprising the composition of claim 28.

37. A wetting agent, or a flow agent, or a leveling agent, comprising the composition of claim 31.

38. A wetting agent, or a flow agent, or a leveling agent, comprising the composition of claim 33.

39. A wetting agent, or a flow agent, or a leveling agent, comprising the composition of claim 34.

40. A fluorine containing copolymer, comprising:
the reaction product of
(i) at least one polyoxetane having an ester linkage with (ii) polyester forming monomers or at least one polyester to form said copolymer, said ester linkage being derived from the reaction of a hydroxyl group of said polyoxetane with a carboxylic acid group of a polycarboxylic acid or an anhydride thereof; said polyoxetane having from 2 to about 200 repeat units derived from an oxetane monomer having at least one pendant —CH$_2$—O—(CH$_2$)$_n$—R$_f$ group, with each n being, independently, 1 to about 6; wherein each R$_f$ independently, is a fluorinated linear alkyl having from 1 to about 7 carbon atoms or a fluorinated branched alkyl wherein the longest chain is an alkyl having from 1 to about 7 carbon atoms and each branched chain, independently, having from 1 to about 3 carbon atoms, and each R$_f$, whether linear or branched, has at least one carbon atom bonded to at least one fluorine atom, wherein each said R$_f$, independently, has at least 25% of the non-carbon atoms of said alkyl being fluorine atoms and the remaining non-carbon atoms being H, I, Cl, or Br; optionally said polyoxetane being copolymerized with at least one cyclic ether comonomer having from 2 to 4 carbon atoms in the ring; wherein said at least one polyester is derived from an ester condensation reaction of, and wherein said polyester forming monomers are, at least one polycarboxylic acid or an anhydride thereof with at least one polyol or at least one cyclic ether, and wherein said poly(oxetane-ester)copolymer has at least one polar group covalently bonded thereto, wherein each said at least one polar group, independently, is an anion-countercation; or a cation-counteranion; or an amphoteric group; and optionally (iii) an amino resin.

41. A fluorine containing copolymer according to claim 40, wherein $R_f$, independently, has a minimum of 50% of the non-carbon atoms replaced by F; wherein said polycarboxylic acid forming said ester linkage has from 3 to about 30 carbon atoms, and wherein the amount of said comonomer is up to about 90 percent by weight based on the total weight of said comonomer and said oxetane monomer.

42. A fluorine containing copolymer according to claim 41, wherein said polyoxetane has from 2 to about 20 repeat units.

43. A fluorine containing copolymer according to claim 42, wherein said polyoxetane has from 2 to about 10 repeat units, wherein $R_f$ is an alkyl having a minimum of 85% of said non-carbon atoms replaced by F; wherein said one or more polycarboxylic acids or an anhydride thereof from which said polyester is derived contains from 3 to about 30 carbon atoms, wherein said one or more polyols from which said polyester is derived contains from 2 to about 20 carbon atoms, wherein said polyester is formed in the presence of said polyoxetane having said ester linkage, and wherein said anion is —$CO_2^-$ (Carboxylate), —$SO_3^-$ (Sulfonate), —$OSO_3^-$ (Sulfate), —$OPO_3^-$ (Phosphate), or —$ONO_2^-$ (Nitrate), wherein said countercation is $Li^+$ (lithium), $Na^+$ (sodium), $K^+$ (potassium), $Cs^+$ (cesium) or $NH_{4-x}R_x^+$ (quaternary ammonium) where x=4, or $NH_{4-x}R_x^+$ (ammonium) where x=0 to 3;

wherein said cation is $NH_{4-x}R_x^+$ (quaternary ammonium) where x=4 or $NH_{4-x}R_x^+$ (ammonium) where x=0 to 3, or $PH_{4-x}R_x^+$ (Phosphonium), and wherein said counteranion is $F^-$ (fluoride), $Cl^-$ (chloride), $Br^-$ (bromide), $I^-$ (iodide), $I_3^-$, or $BF_4^-$ (tetrafluoroborate), and wherein said amphoteric is a covalent bonded cationic amine group and an anionic surfactant, wherein said R is a hydrocarbyl having from 1 to about 10 carbon atoms, wherein $R_f$ is a linear alkyl containing from 2 to about 4 carbon atoms or branched alkyl having a longest chain of from 2 to about 4 carbon atoms with each branched chain containing from about 1 to about 2 carbon atoms and wherein said polar group is located on at least one end of said polymer.

44. A fluorine containing copolymer according to claim 43, wherein said polycarboxylic acid forming said ester linkage has from 3 to about 10 carbon atoms, wherein said polycarboxylic acid from which said polyester is derived is adipic acid and isophthalic acid, and wherein said polyol from which said polyester is derived is 2,2-dimethyl-1,3-propanediol, trimethylol propane, and cyclohexane dimethanol.

45. A fluorine containing copolymer according to claim 43, wherein said polyoxetane is additionally derived from said cyclic ether comonomer having from 2 to 4 carbons in the ring.

46. A fluorine containing copolymer according to claim 45, wherein said cyclic ether is tetrahydrofuran, wherein the amount of said cyclic ether comonomer is up to about 20% by weight based upon the total weight of said comonomer and said oxetane monomer, wherein said carboxylic acid from which said ester linkage is derived is adipic acid, or cyclohexane dioic acid; and wherein said poly(oxetane-ester) copolymer has about 2 polar groups.

47. A fluorine containing copolymer according to claim 40, including the reaction product of said copolymer with said amino resin.

48. A fluorine containing copolymer according to claim 43, including the reaction product of said copolymer with said amino resin.

49. A fluorine containing copolymer according to claim 46, including the reaction product of said copolymer with said amino resin, and wherein said amino resin comprises alkylated benzoguanamine-formaldehyde, alkylated melamine-formaldehyde, alkylated urea-formaldehyde, or combinations thereof.

50. A wetting agent, or a flow agent, or a leveling agent, comprising:

a polymer derived from at least one cyclic ether having a total of from 2 to about 5 carbon atoms in the ring and from 1 to about 20 carbon atoms substituted on any ring carbon atom, said cyclic ether having at least one pendant group comprising an $R_f$ group, wherein each $R_f$, independently, is a fluorinated linear alkyl having from 1 to about 7 carbon atoms or a fluorinated branched alkyl wherein the longest chain is an alkyl having from 1 to about 7 carbon atoms and each branched chain, independently, having from 1 to about 3 carbon atoms, and each $R_f$, whether linear or branched, has at least one carbon atom bonded to at least one fluorine atom, and wherein each said $R_f$, independently, has at least 25% of the non-carbon atoms of said alkyl being fluorine atoms and the remaining non-carbon atoms being H, I, Cl, or Br; optionally said polymer being derived from at least one comonomer; and said polymer having at least one polar group covalently bonded thereto, and wherein said wetting, or flow, or leveling agent has a surface tension of from about 25 to about 70 millinewtons per meter at 0.1% by weight of said polymer composition in water.

51. A wetting agent, or a flow agent, or a leveling agent composition, according to claim 50, wherein at least 50% of the non-carbon atoms of said $R_f$ alkyl group are fluorine atoms, and wherein each said polar group independently, is an anion-countercation, or a cation-counteranion or a nonionic, or an amphoteric.

52. A wetting agent, or a flow agent, or a leveling agent composition according to claim 51, wherein said $R_f$ is a linear alkyl having from 1 to 6 carbon atoms or a branched alkyl having a longest chain of from about 1 to about 6 carbon atoms and each branched chain, independently, has from about 1 to about 2 carbon atoms, and wherein said cyclic ether is oxirane, epichlorohydrin, propylene oxide, ethylene oxide, butyl glycidylether, perfluorooctyl propylene oxide, oxetane, 3,3-bis(chloromethyl)oxetane, 3,3-bis(bromomethyl)oxetane, 3,3-bromo methyl(methyl)oxetane; tetrahydrofuran, tetrahydropyran, or 2-methyltetrahydrofuran.

53. A wetting agent, or a flow agent, or a leveling agent composition according to claim 52, wherein at least 80% of the non-carbon atoms of said $R_f$ group are fluorine atoms, and wherein said polymer has a total of from 2 to about 10 polar groups.

54. A wetting agent, or a flow agent, or a leveling agent composition according to claim 53, wherein said anion is —$CO_2^-$ (Carboxylate), —$SO_3^-$ (Sulfonate), —$OSO_3^-$ (Sulfate), —$OPO_3^-$ (Phosphate), or —$ONO_2^-$ (Nitrate), wherein said countercation is $Li^+$ (lithium), $Na^+$ (sodium), $K^+$ (potassium), $Cs^+$ (cesium) or $NH_{4-x}R_x^+$ (quaternary ammonium) where x=4, or $NH_{4-x}R_x^+$ (ammonium) where x=0 to 3;

wherein said cation is $NH_{4-x}R_x^+$ (quaternary ammonium) where x=4, or $NH_{4-x}R_x^+$ (ammonium) where x=0 to 3, or $PH_{4-x}R_x^+$ (Phosphonium), and wherein said counteranion is $F^-$ (fluoride), $Cl^-$ (chloride), $Br^-$ (bromide), $I^-$ (iodide), $I_3^-$, or $BF_4^-$ (tetrafluoroborate), and wherein said nonionic is $-O-(CH_2CH_2O)_n-H$ (poly(ethylene oxide)), or $-O-(CH(CH_3)CH_2O)_n-H$ (poly(propylene oxide)), where n is from about 1 to about 100, or carbonyl, carboxyl, nitrile, thiol, orcyano, and wherein said amphoteric is a covalent bonded cationic amine group and an anionic surfactant, and wherein said R is a hydrocarbyl having 1 to about 10 carbon atoms.

55. A wetting agent, or a flow agent, or a leveling agent composition, according to claim 54, wherein said polymer is polyoxirane or polyoxetane, and wherein said polyoxirane or said polyoxetane has from 2 to about 10 repeat groups, wherein said optional comonomer is tetrahydrofuran, and wherein said $R_f$ is a linear alkyl containing from 2 to about 4 carbon atoms or a branched alkyl having a longest chain of from about 2 to about 4 carbon atoms with each branched chain containing from 1 to about 2 carbon atoms.

56. A wetting agent, or a flow agent, or a leveling agent composition according to claim 55, including said tetrahydrofuran, wherein each said oxirane or said oxetane repeat unit contains said pendant $R_f$ group, wherein said polyoxirane or said polyoxetane contains two said polar groups located on the end thereof, and wherein said surface tension is from about 25 to about 35 millinewtons per meter.

57. A wetting agent, or a flow agent, or a leveling agent composition according to claim 50, wherein said polymer is said polyoxetane and said polyoxetane has the formula

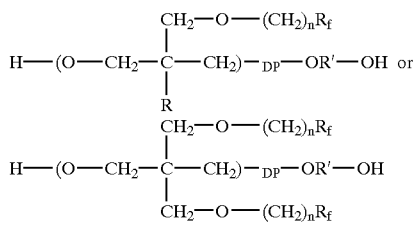

wherein R' is an alkyl having from 1 to about 18 carbon atoms, and wherein R is an alkyl having from 1 to 6 carbon atoms wherein DP is from about 2 to about 100, or

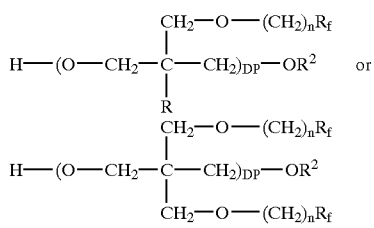

wherein R is an alkyl having from 1 to 6 carbon atoms, wherein $R^2$ is derived from an organic monoalcohol having from 1 to about 40 carbon atoms wherein DP is from about 2 to about 50, and wherein said surface tension is from about 25 to about 35 millinewtons per meter.

58. A wetting agent, or a flow agent, or a leveling agent composition according to claim 56, wherein said polymer is said polyoxetane and said polyoxetane has the formula

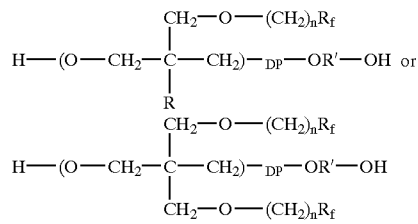

wherein R' is an alkyl having from 1 to about 18 carbon atoms, wherein R is an alkyl having from 1 to 6 carbon atoms wherein DP is from about 2 to about 50, or

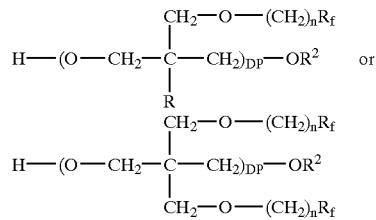

wherein R is an alkyl having from 1 to 6 carbon atoms, and wherein $R^2$ is derived from an organic monoalcohol having from 1 to about 40 carbon atoms wherein DP is from about 2 to about 20.

59. A wetting agent, or flow agent, or leveling agent comprising the composition of claim 50, wherein said wetting, or flow, or leveling agent is reacted with another polymer.

60. A wetting agent, or flow agent, or leveling agent comprising the composition of claim 52, wherein said wetting, or flow, or leveling agent is reacted with another polymer.

61. A wetting agent, or flow agent, or leveling agent comprising the composition of claim 54, wherein said wetting, or flow, or leveling agent is reacted with another polymer.

62. A wetting agent, or flow agent, or leveling agent comprising the composition of claim 56, wherein said wetting, or flow, or leveling agent is reacted with another polymer.

63. A wetting agent, or flow agent, or leveling agent comprising the composition of claim 58, wherein said wetting, or flow, or leveling agent is reacted with another polymer.

64. A powder coating, comprising:
a polyoxetane having from 2 to about 100 repeat units derived from oxetane monomers, said polyoxetane having at least one pendant group comprising an $R_f$ group, wherein each $R_f$, independently, is a fluorinated linear alkyl having from 1 to about 7 carbon atoms or a fluorinated branched alkyl wherein the longest chain is an alkyl having from 1 to about 7 carbon atoms and each branched chain, independently, having from 1 to about 3 carbon atoms, and each $R_f$, whether linear or branched, has at least one carbon atom bonded to at least one fluorine atom, and wherein each said $R_f$, independently, has at least 25% of the non-carbon atoms of said alkyl being fluorine atoms and the remaining non-carbon atoms being H, I, Cl, or Br; optionally said polyoxetane being derived from at least one comonomer; and
said polyoxetane having at least one polar group covalently bonded thereto.

65. A powder coating according to claim 64, wherein at least 75% of the non-carbon atoms of said $R_f$ alkyl group are fluorine atoms, and wherein each said at least one polar group independently, is an anion-countercation, or a cation-counteranion, or a nonionic, or an amphoteric.

66. A powder coating according to claim 65, wherein said pendant group comprises —$CH_2$—O—$(CH_2)_n$—$R_f$, where n is from 1 to 6, wherein said $R_f$ is a linear alkyl having from 1 to 6 carbon atoms or a branched alkyl having a longest chain of from about 1 to about 6 carbon atoms and each branched chain, independently, has from about 1 to about 2 carbon atoms, and wherein at least 50% of the oxetane repeat units contain said pendant —$CH_2$—O—$(CH_2)_n$—$R_f$, and wherein said anion is —$CO_2^-$ (Carboxylate), —$SO_3^-$ (Sulfonate), —$OSO_3^-$ (Sulfate), —$OPO_3^-$ (Phosphate), or —$ONO_2^-$ (Nitrate), wherein said countercation is $Li^+$ (lithium), $Na^+$ (sodium), $K^+$ (potassium), $Cs^+$ (cesium) or $NH_{4-x}R_x^+$ (quaternary ammonium) where x=4, or $NH_{4-x}R_x^+$ (ammonium) where x=0 to 3;

wherein said cation is $NH_{4-x}R_x^+$ (quaternary ammonium) where x=4, or $NH_{4-x}R_x^+$ (ammonium) where x=0 to 3, or $PH_{4-x}R_x^+$ (Phosphonium), and wherein said counteranion is $F^-$ (fluoride), $Cl^-$ (chloride), $Br^-$ (bromide), $I^-$ (iodide), $I_3^-$, or $BF_4^-$ (tetrafluoroborate), and wherein said nonionic is —O—$(CH_2CH_2O)_n$—H (poly(ethylene oxide)), or —O—$(CH(CH_3)CH_2O)_n$—H (poly(propylene oxide)), where n is from about 1 to about 100, or carbonyl, carboxyl, nitrile, thiol, or cyano, and wherein said amphoteric is a covalent bonded cationic amine group and an anionic surfactant, and wherein said R is a hydrocarbyl having from 1 to about 10 carbon atoms.

67. A powder coating according to claim 66, wherein said polyoxetane has from 2 to about 10 repeat groups, and wherein said $R_f$ is a linear alkyl containing from 2 to about 4 carbon atoms or a branched alkyl having a longest chain of from about 2 to about 4 carbon atoms with each branched chain containing from about 1 to about 2 carbon atoms, and wherein substantially each said oxetane repeat unit contains said pendant repeat group, and wherein said polyoxetane contains two of said polar groups.

68. A powder coating according to claim 67, including said comonomer and wherein said comonomer is tetrahydrofuran, wherein said polyoxetane has the formula

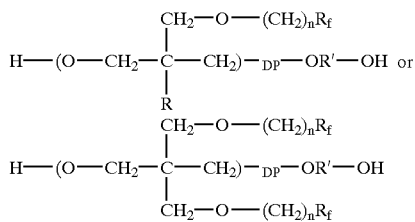

wherein said DP is from 2 to about 50, wherein R' is an alkyl having from 1 to about 18 carbon atoms, wherein R is an alkyl having from 1 to 6 carbon atoms, or

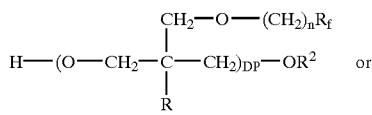

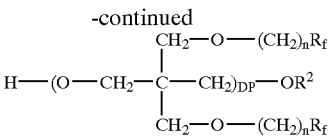

wherein said DP is from about 2 to about 20, wherein R is an alkyl having from 1 to 6 carbon atoms, and wherein $R^2$ is derived from an organic monoalcohol having from 1 to about 40 carbon atoms.

69. A composition comprising:

a polymeric material having at least one covalently bonded nonionic polar end group and having at least one pendant group comprising a —$CH_2O$—$(CH_2)_nR_f$ group where each said n is from 1 to about 6 and each said at least one nonionic polar end group, independently, is a carbonyl, or a nitrile, or a thiol, or a cyano group;

wherein each said $R_f$ group, independently, is a fluorinated linear alkyl having from 1 to about 7 carbon atoms, or a fluorinated branched alkyl wherein the longest chain is from 1 to about 7 carbon atoms and each branch, independently, contains from 1 to about 3 carbon atoms, and each $R_f$, whether linear or branched, has at least one carbon atom bonded to at least one fluorine atom, and wherein each $R_f$ group, independently, has at least 25% of the non-carbon atoms being fluorine atoms and the remaining non-carbon atoms being H, I, Cl, or Br, and wherein said polymer is derived from at least one cyclic ether monomer having at total of from 2 to 5 carbon atoms in the ring with a total of 1 to about 20 substituted carbon atoms, or dioxane, or dioxalane, or trioxane, and optionally said polymer being derived from a comonomer.

70. A composition according to claim 69, wherein at least 50% of the non-carbon atoms in said $R_f$ group are fluorine atoms, wherein the number of repeat units of said polymer is from about 2 to about 100, wherein at least 50% of said repeat units contain said Rf group, and wherein said $R_f$ group is a linear alkyl group having from 1 to 6 carbon atoms, or a branched alkyl group having a longest chain of from 1 to 6 carbon atoms and each branch chain independently having from 1 to about 2 carbon atoms.

71. A composition according to claim 70, wherein at least 75% of the non-carbon atoms in said $R_f$ group are fluorine atoms, wherein said polymer is derived from an oxetane monomer having said pendand $R_f$ group, and wherein said comonomer is tetrahydrofuran.

72. A composition according to claim 71, wherein $R_f$ is a linear alkyl having from about 2 to about 4 carbon atoms or a branch alkyl having a longest chain of from 2 to about 4 carbon atoms with said branch chains independently, having from 1 to about 2 carbon atoms, and wherein at least 95% of the non-carbon atoms in said $R_f$ group are fluorine atoms, and wherein said polyoxetane has the formula

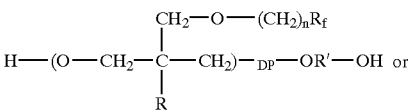

-continued

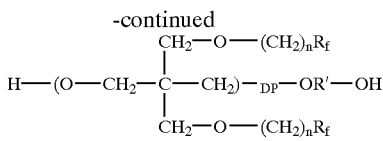

wherein said DP is from 2 to about 50, wherein R' is an alkyl having from 1 to about 18 carbon atoms, wherein R is an alkyl having from 1 to 6 carbon atoms, or

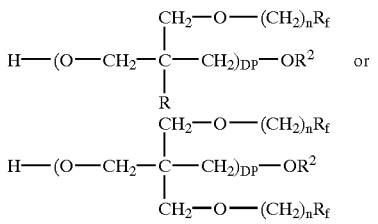

wherein said DP is from about 2 to about 20, wherein R is an alkyl having from 1 to 6 carbon atoms, wherein $R^2$ is derived from an organic monoalcohol having from 1 to about 40 carbon atoms.

73. A wetting agent, or a flow agent, or a leveling agent, comprising the composition of claim 69.

74. A wetting agent, or a flow agent, or a leveling agent, comprising the composition of claim 72.

75. A surface active material comprising the composition of claim 69.

76. A surface active material comprising the composition of claim 72.

77. A floor polish comprising the composition of claim 69.

78. A floor polish comprising the composition of claim 72.

79. A fluorine containing copolymer, comprising:
the reaction product of
(i) at least one polyoxetane having an ester linkage with
(ii) polyester forming monomers or at least one polyester to form said copolymer, said ester linkage being derived from the reaction of a hydroxyl group of said polyoxetane with a carboxylic acid group of a polycarboxylic acid or an anhydride thereof; said polyoxetane having from 2 to about 200 repeat units derived from an oxetane monomer having at least one pendant —$CH_2$—O—$(CH_2)_n$—$R_f$ group, with each n being, independently, 1 to about 6; wherein each $R_f$ independently, is a fluorinated linear alkyl having from 1 to about 7 carbon atoms or a fluorinated branched alkyl wherein the longest chain is an alkyl having from 1 to about 7 carbon atoms and each branched chain, independently, having from 1 to about 3 carbon atoms, and each $R_f$, whether linear or branched, has at least one carbon atom bonded to at least one fluorine atom, wherein each said $R_f$, independently, has at least 25% of the non-carbon atoms of said alkyl being fluorine atoms and the remaining non-carbon atoms being H, I, Cl, or Br; optionally said polyoxetane being copolymerized with at least one cyclic ether comonomer having from 2 to 4 carbon atoms in the ring; wherein said at least one polyester is derived from an ester condensation reaction of, and wherein said polyester forming monomers are, at least one polycarboxylic acid or an anhydride thereof with at least one polyol or at least one cyclic ether, and wherein said poly(oxetane-ester)copolymer has at least one polar group covalently bonded thereto, wherein each said at least one polar group, independently, is a carbonyl, or a nitrile, or a thio, or a cyano group; and optionally (iii) an amino resin.

80. A fluorine containing copolymer according to claim 79, wherein $R_f$, independently, has a minimum of 50% of the non-carbon atoms replaced by F; wherein said polycarboxylic acid forming said ester linkage has from 3 to about 30 carbon atoms, and wherein the amount of said comonomer is up to about 90 percent by weight based on the total weight of said comonomer and said oxetane monomer.

81. A fluorine containing copolymer according to claim 80, wherein said polyoxetane has from 2 to about 20 repeat units.

82. A fluorine containing copolymer according to claim 80, wherein said polyoxetane has from 2 to about 10 repeat units, wherein $R_f$ is an alkyl having a minimum of 85% of said non-carbon atoms replaced by F; wherein said one or more polycarboxylic acids or an anhydride thereof from which said polyester is derived contains from 3 to about 30 carbon atoms, wherein said one or more polyols from which said polyester is derived contains from 2 to about 20 carbon atoms, wherein said polyester is formed in the presence of said polyoxetane having said ester linkage, and wherein $R_f$ is a linear alkyl containing from 2 to about 4 carbon atoms or branched alkyl having a longest chain of from 2 to about 4 carbon atoms with each branched chain containing from about 1 to about 2 carbon atoms and wherein said polar group is located on at least one end of said polymer.

83. A fluorine containing copolymer according to claim 81, wherein said polycarboxylic acid forming said ester linkage has from 3 to about 10 carbon atoms, wherein said polycarboxylic acid from which said polyester is derived is adipic acid and isophthalic acid, and wherein said polyol from which said polyester is derived is 2,2-dimethyl-1,3-propanediol, trimethylol propane, and cyclohexane dimethanol.

84. A fluorine containing copolymer according to claim 81, wherein said polyoxetane is additionally derived from said cyclic ether comonomer having from 2 to 4 carbons in the ring.

85. A fluorine containing copolymer according to claim 84, wherein said cyclic ether is tetrahydrofuran, wherein the amount of said cyclic ether comonomer is up to about 20% by weight based upon the total weight of said comonomer and said oxetane monomer, wherein said carboxylic acid from which said ester linkage is derived is adipic acid, or cyclohexane dioic acid; and wherein said poly(oxetane-ester)copolymer has about 2 polar groups.

86. A fluorine containing copolymer according to claim 79, including the reaction product of said copolymer with said amino resin.

87. A fluorine containing copolymer according to claim 81, including the reaction product of said copolymer with said amino resin.

88. A fluorine containing copolymer according to claim 85, including the reaction product of said copolymer with said amino resin, and wherein said amino resin comprises alkylated benzoguanamine-formaldehyde, alkylated melamine-formaldehyde, alkylated urea-formaldehyde, or combinations thereof.

* * * * *